(12) United States Patent
Wang et al.

(10) Patent No.: US 12,004,186 B2
(45) Date of Patent: Jun. 4, 2024

(54) PHYSICAL DOWNLINK CONTROL CHANNEL (PDCCH) RELIABILITY USING SIDELINK

(71) Applicant: QUALCOMM Incorporated, San Diego, CA (US)

(72) Inventors: Hua Wang, Basking Ridge, NJ (US); Sony Akkarakaran, Poway, CA (US); Mostafa Khoshnevisan, San Diego, CA (US); Tao Luo, San Diego, CA (US); Junyi Li, Fairless Hills, PA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/650,158

(22) Filed: Feb. 7, 2022

(65) Prior Publication Data
US 2023/0309103 A1 Sep. 28, 2023

(51) Int. Cl.
*H04W 72/23* (2023.01)
*H04B 7/155* (2006.01)
*H04W 72/044* (2023.01)

(52) U.S. Cl.
CPC ............ *H04W 72/23* (2023.01); *H04B 7/155* (2013.01); *H04W 72/044* (2013.01)

(58) Field of Classification Search
CPC ... H04W 72/23; H04W 72/044; H04W 72/25; H04W 72/27; H04W 88/04; H04W 92/18; H04W 4/40; H04W 4/46; H04B 7/155; H04L 5/0094; H04L 5/0053
See application file for complete search history.

(56) References Cited

U.S. PATENT DOCUMENTS

| 2012/0281683 | A1   | 11/2012 | Falconetti et al. |
|--------------|------|---------|-------------------|
| 2017/0105112 | A1 * | 4/2017  | Park ...................... H04L 5/0048 |
| 2019/0208539 | A1   | 7/2019  | Christoffersson et al. |
| 2019/0229964 | A1 * | 7/2019  | Ouchi .................... H04L 5/0051 |
| 2020/0022089 | A1 * | 1/2020  | Guo ..................... H04W 52/242 |

(Continued)

FOREIGN PATENT DOCUMENTS

WO  WO-2020033719 A1 *  2/2020  ........... H04L 1/1812
WO  WO-2023282663 A2 *  1/2023

OTHER PUBLICATIONS

International Search Report and Written Opinion—PCT/US2022/080835—ISA/EPO—Apr. 24, 2023.

*Primary Examiner* — Mohamed A Kamara
(74) *Attorney, Agent, or Firm* — Muncy, Geissler, Olds & Lowe, P.C./Qualcomm

(57) ABSTRACT

Disclosed are techniques for wireless communication. In an aspect, a target user equipment (UE) receives, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI, and communicates with the network entity using a resource allocation granted by the DCI for a physical downlink channel, a physical uplink channel, or both between the target UE and the network entity based on the DCI and the search space information.

30 Claims, 20 Drawing Sheets

(56) References Cited

U.S. PATENT DOCUMENTS

2020/0314822 A1* 10/2020 Lee ..................... H04W 72/12
2021/0127396 A1    4/2021 Su et al.
2022/0070851 A1*  3/2022 Zhang .................. H04L 1/0046

* cited by examiner

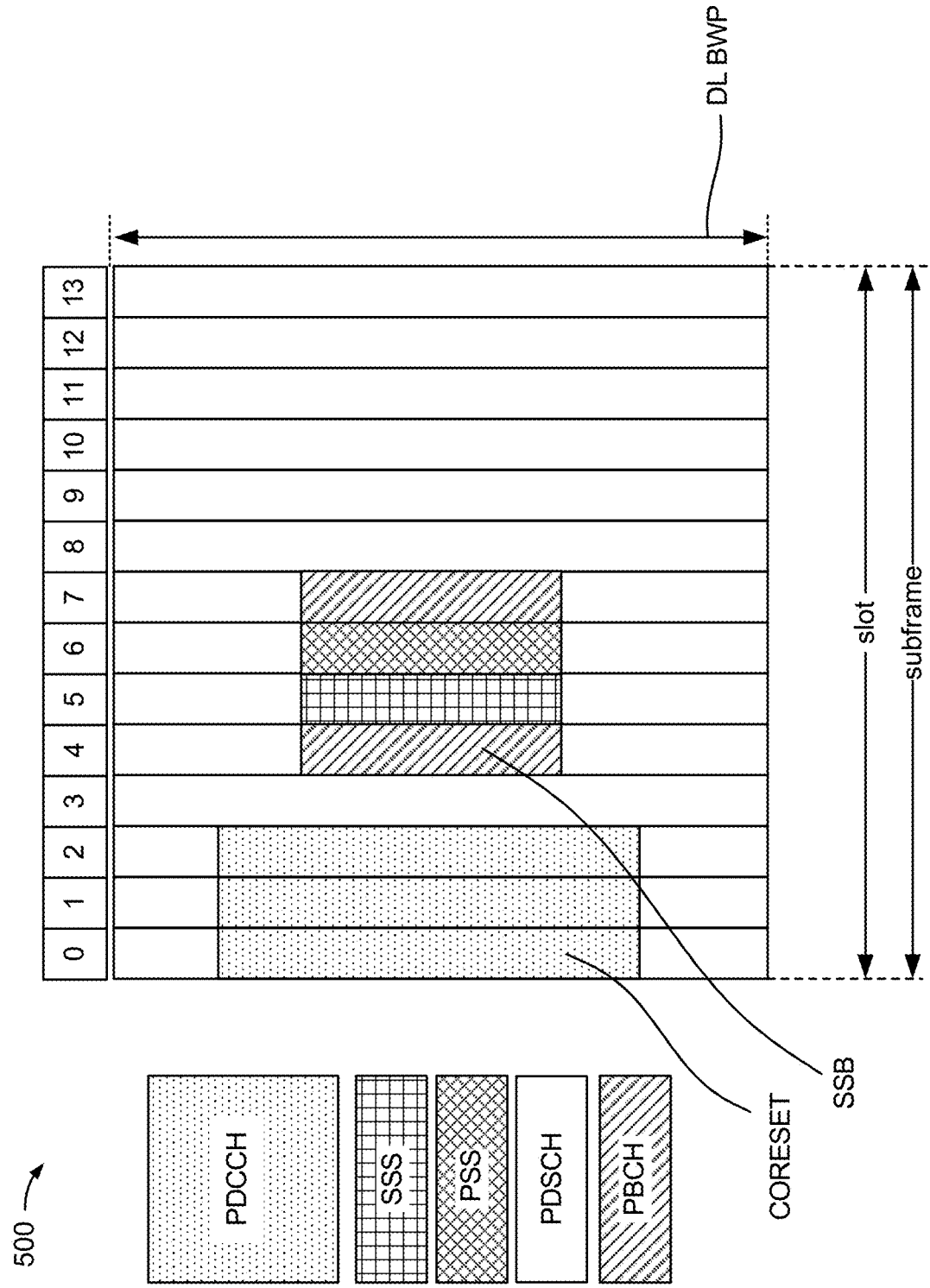

PHYSICAL DOWNLINK CONTROL CHANNEL (PDCCH) RELIABILITY USING SIDELINK

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a relay user equipment (UE) includes receiving, from a network entity, downlink control information (DCI) for a communication session between the network entity and a target UE; and transmitting the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

In an aspect, a method of wireless communication performed by a target user equipment (UE) includes receiving, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and communicating with the network entity using a resource allocation granted by the DCI for a physical downlink channel, a physical uplink channel, or both between the target UE and the network entity based on the DCI and the search space information.

In an aspect, a method of wireless communication performed by a network entity includes transmitting, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and communicating with the target UE using the resource allocation granted by the DCI for the physical downlink channel, the physical uplink channel, or both between the target UE and the network entity based on the DCI and the search space information.

In an aspect, a relay user equipment (UE) includes a memory; at least one transceiver; and at least one processor communicatively coupled to the memory and the at least one transceiver, the at least one processor configured to: receive, via the at least one transceiver, from a network entity, downlink control information (DCI) for a communication session between the network entity and a target UE; and transmit, via the at least one transceiver, the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

In an aspect, a target user equipment (UE) includes a memory; at least one transceiver; and at least one processor communicatively coupled to the memory and the at least one transceiver, the at least one processor configured to: receive, via the at least one transceiver, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and communicate, via the at least one transceiver, with the network entity using a resource allocation granted by the DCI for a physical downlink channel, a physical uplink channel, or both between the target UE and the network entity based on the DCI and the search space information.

In an aspect, a network entity includes a memory; at least one transceiver; and at least one processor communicatively coupled to the memory and the at least one transceiver, the at least one processor configured to: transmit, via the at least one transceiver, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and communicate, via the at least one transceiver, with the target UE using the resource allocation granted by the DCI for the physical downlink channel, the physical uplink channel, or both between the target UE and the network entity based on the DCI and the search space information.

In an aspect, a relay user equipment (UE) includes means for receiving, from a network entity, downlink control information (DCI) for a communication session between the network entity and a target UE; and means for transmitting the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

In an aspect, a target user equipment (UE) includes means for receiving, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and means for communicating with the network entity using a resource allocation granted by the DCI for a physical downlink channel, a physical uplink channel, or both between the target UE and the network entity based on the DCI and the search space information.

In an aspect, a network entity includes means for transmitting, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and means for communicating with the target UE using the resource allocation granted by the DCI for the physical downlink channel, the physical uplink channel, or both between the target UE and the network entity based on the DCI and the search space information.

In an aspect, a non-transitory computer-readable medium stores computer-executable instructions that, when executed by a relay user equipment (UE), cause the relay UE to: receive, from a network entity, downlink control information (DCI) for a communication session between the network entity and a target UE; and transmit the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

In an aspect, a non-transitory computer-readable medium stores computer-executable instructions that, when executed by a target user equipment (UE), cause the target UE to: receive, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and communicate with the network entity using a resource allocation granted by the DCI for a physical downlink channel, a physical uplink channel, or both between the target UE and the network entity based on the DCI and the search space information.

In an aspect, a non-transitory computer-readable medium stores computer-executable instructions that, when executed by a network entity, cause the network entity to: transmit, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and communicate with the target UE using the resource allocation granted by the DCI for the physical downlink channel, the physical uplink channel, or both between the target UE and the network entity based on the DCI and the search space information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 is a diagram illustrating various downlink channels within an example downlink slot, according to aspects of the disclosure.

DETAILED DESCRIPTION

Figure 1:
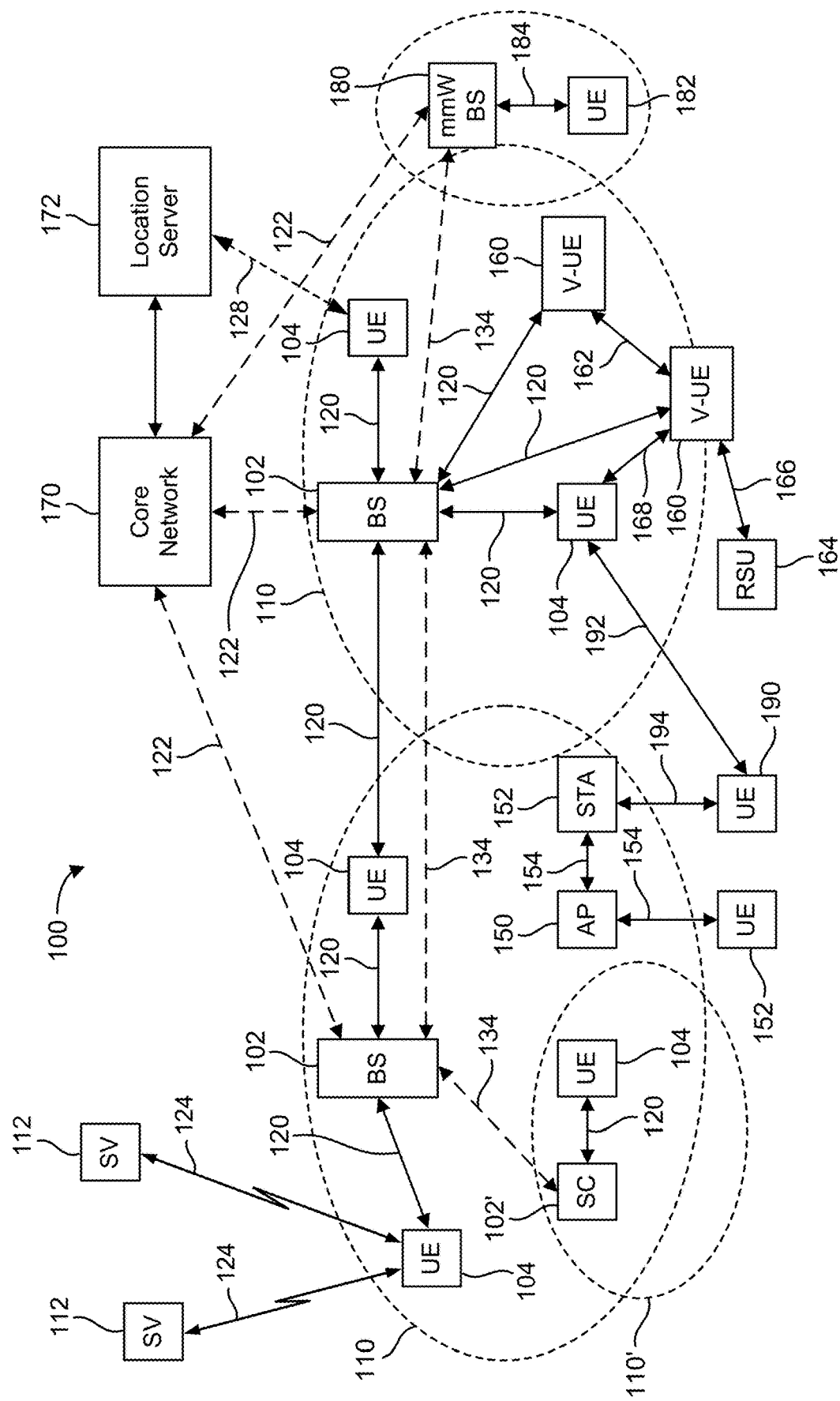
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which the base station is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems the base station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where the context indicates that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports the cell, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, in alternative configurations, one or more base stations 102 may also transmit using mmW or near mmW and beamforming. Accordingly, the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, the network node broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming the downlink beam. For example, if a base station is forming the downlink beam to transmit a reference signal to a UE, the downlink beam is a transmit beam. If the UE is forming the downlink beam, however, the downlink beam is a receive beam to receive the downlink reference signal. Similarly, an "uplink" beam may be either a transmit beam or a receive beam, depending on the entity forming the uplink beam. For example, if a base station is forming the uplink beam, the uplink beam is an uplink receive beam, and if a UE is forming the uplink beam, the uplink beam is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase the data transmission and/or reception rates of the UE 104/182. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication going through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
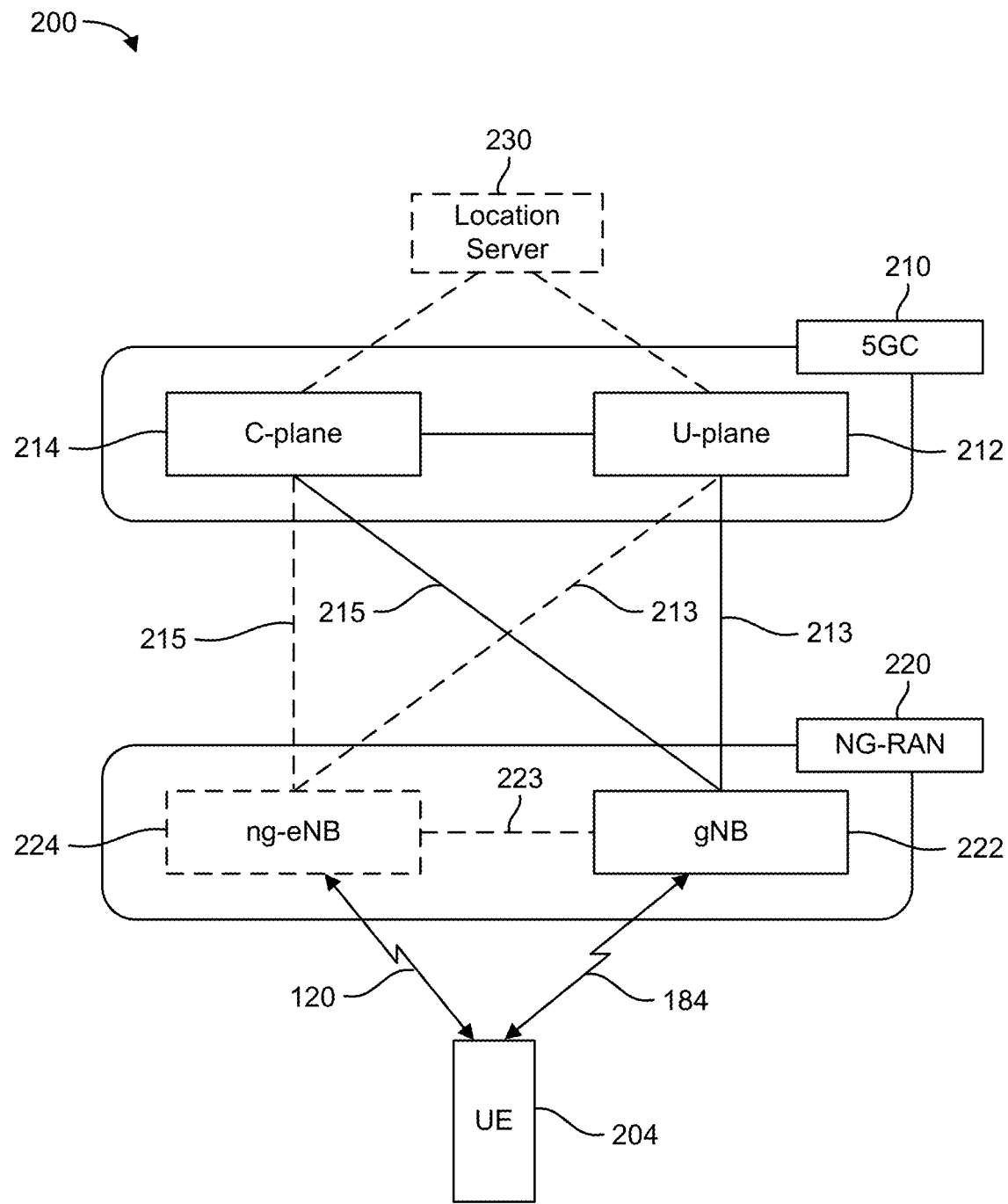
FIGS. 2A to 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
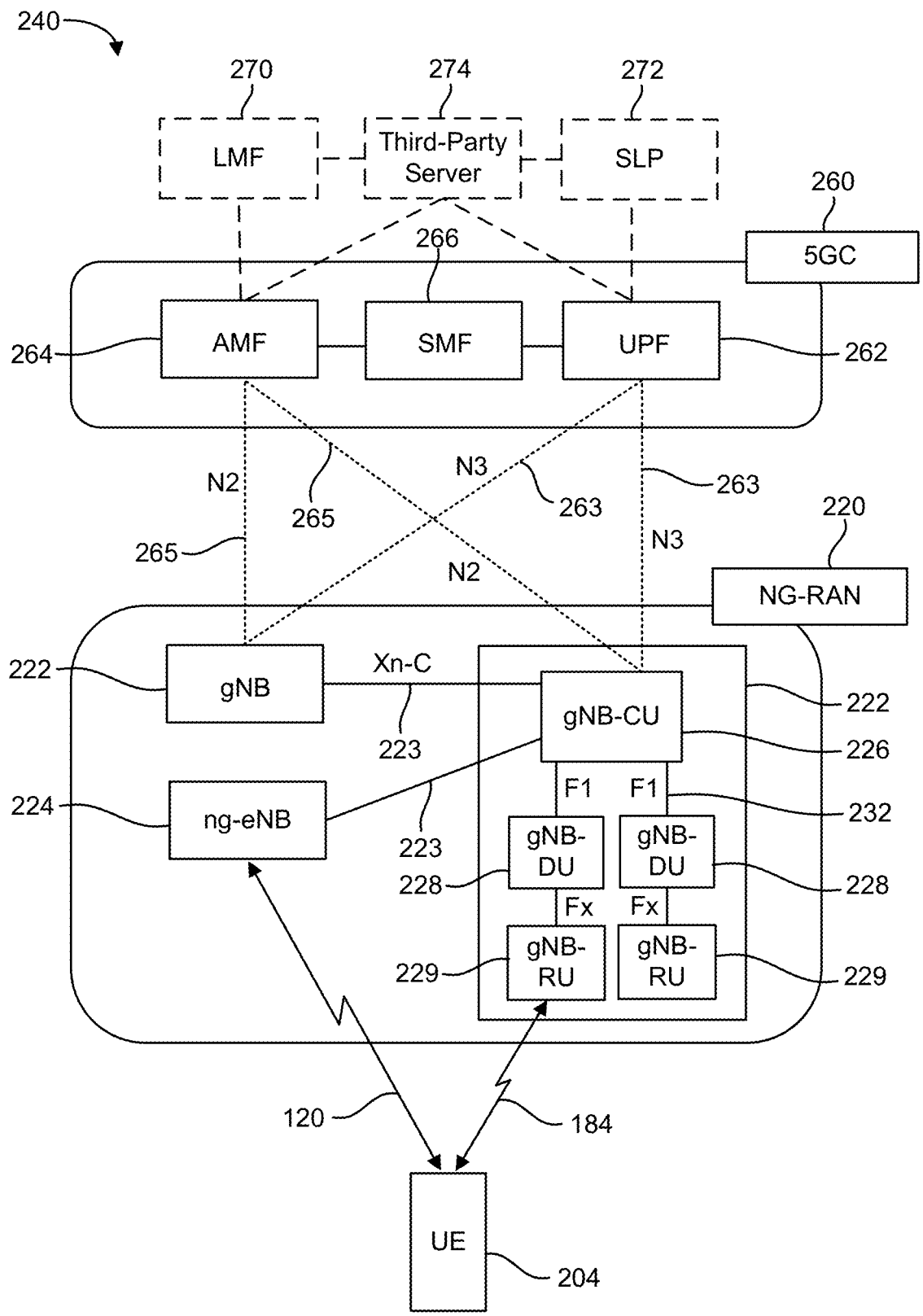

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that the SCM uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. The operation of the gNB-DU 228 is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
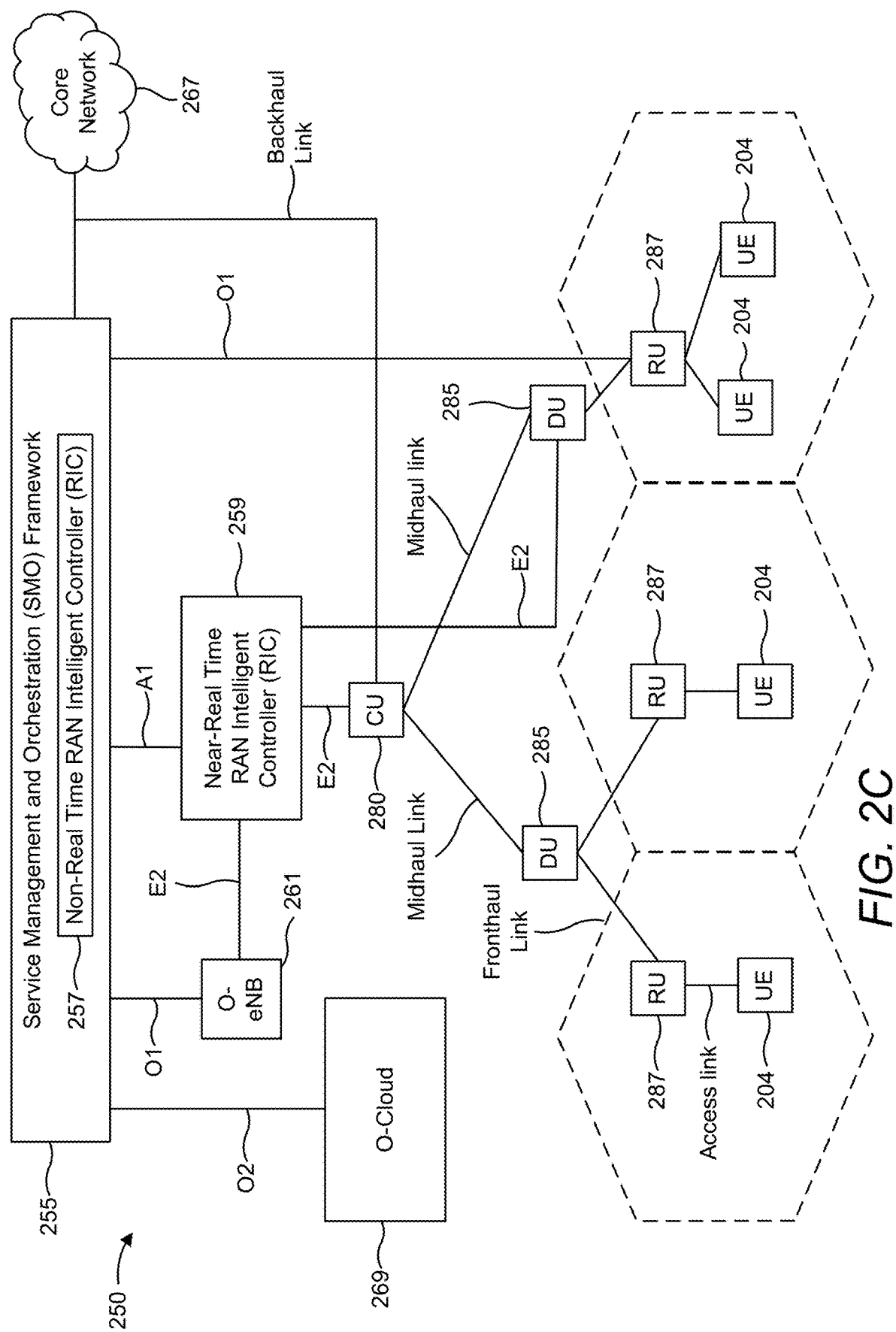

FIG. 2C is a diagram 250 illustrating an example disaggregated base station architecture, according to aspects of the disclosure. The disaggregated base station 250 architecture may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit—User Plane (CU-UP)), control plane functionality (i.e., Central Unit—Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
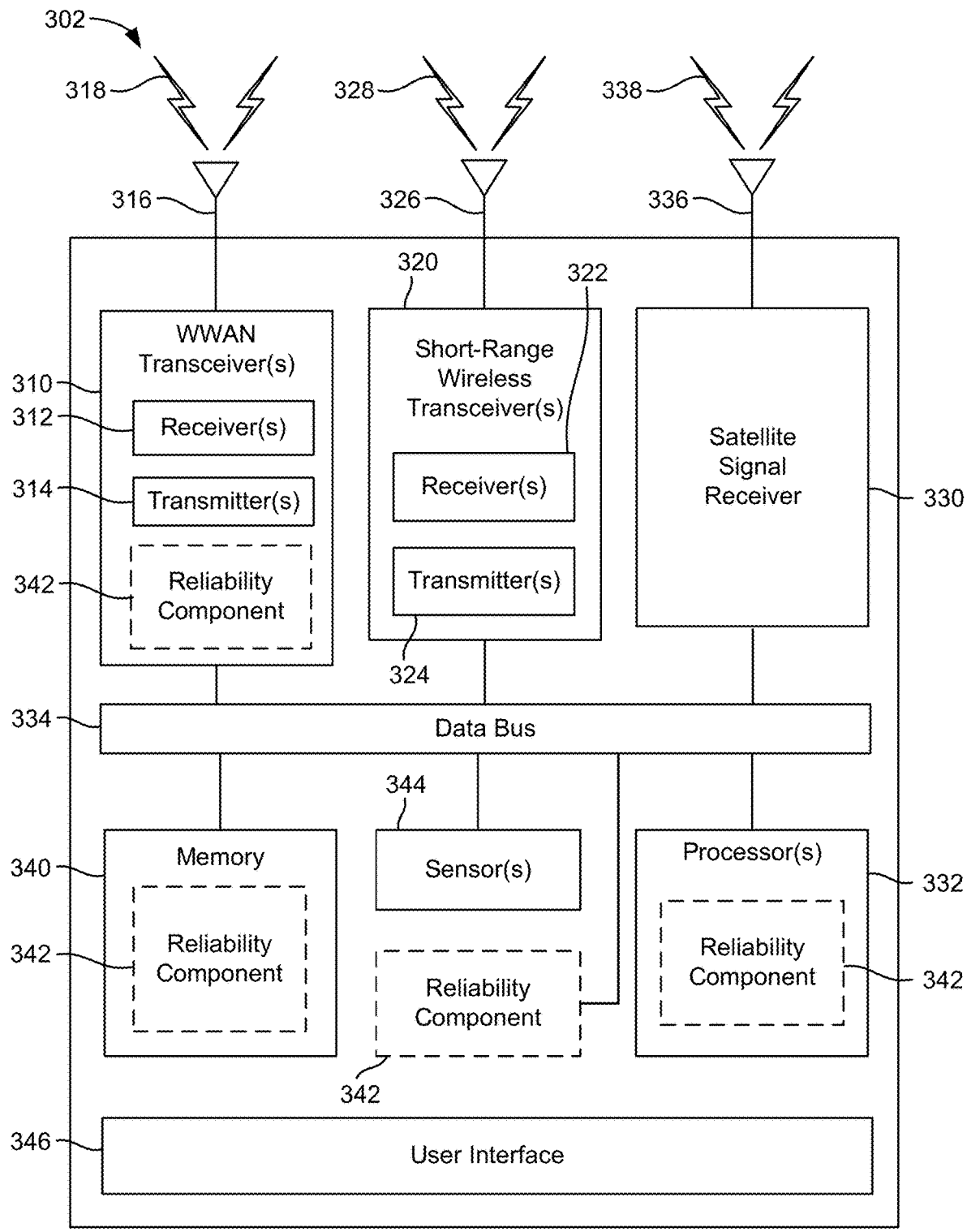
FIGS. 3A, 3B, and 3C are simplified block diagrams of several sample aspects of components that may be employed in a user equipment (UE), a base station, and a network entity, respectively, and configured to support communications as taught herein.
Figure 3B:
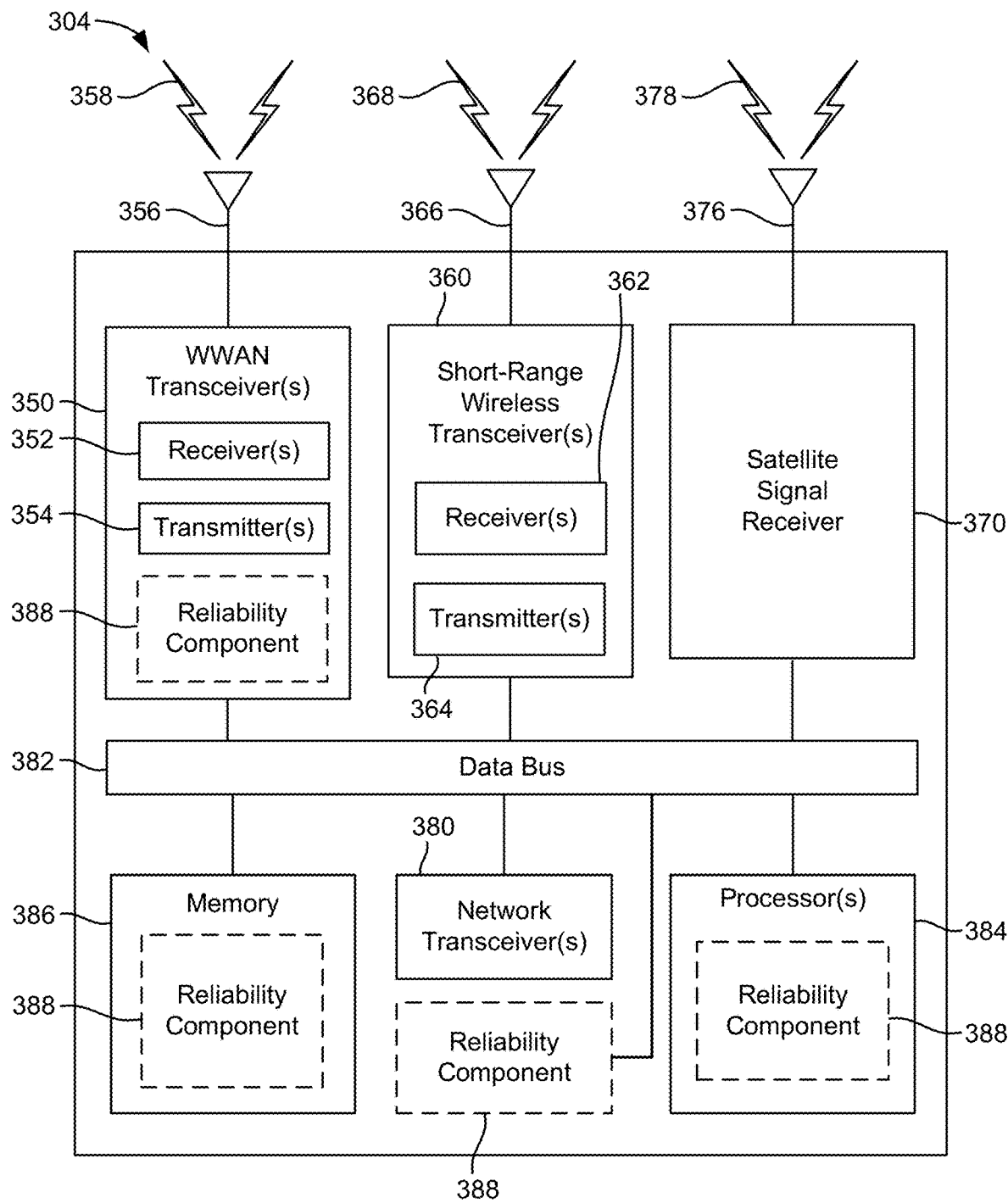
Figure 3C:
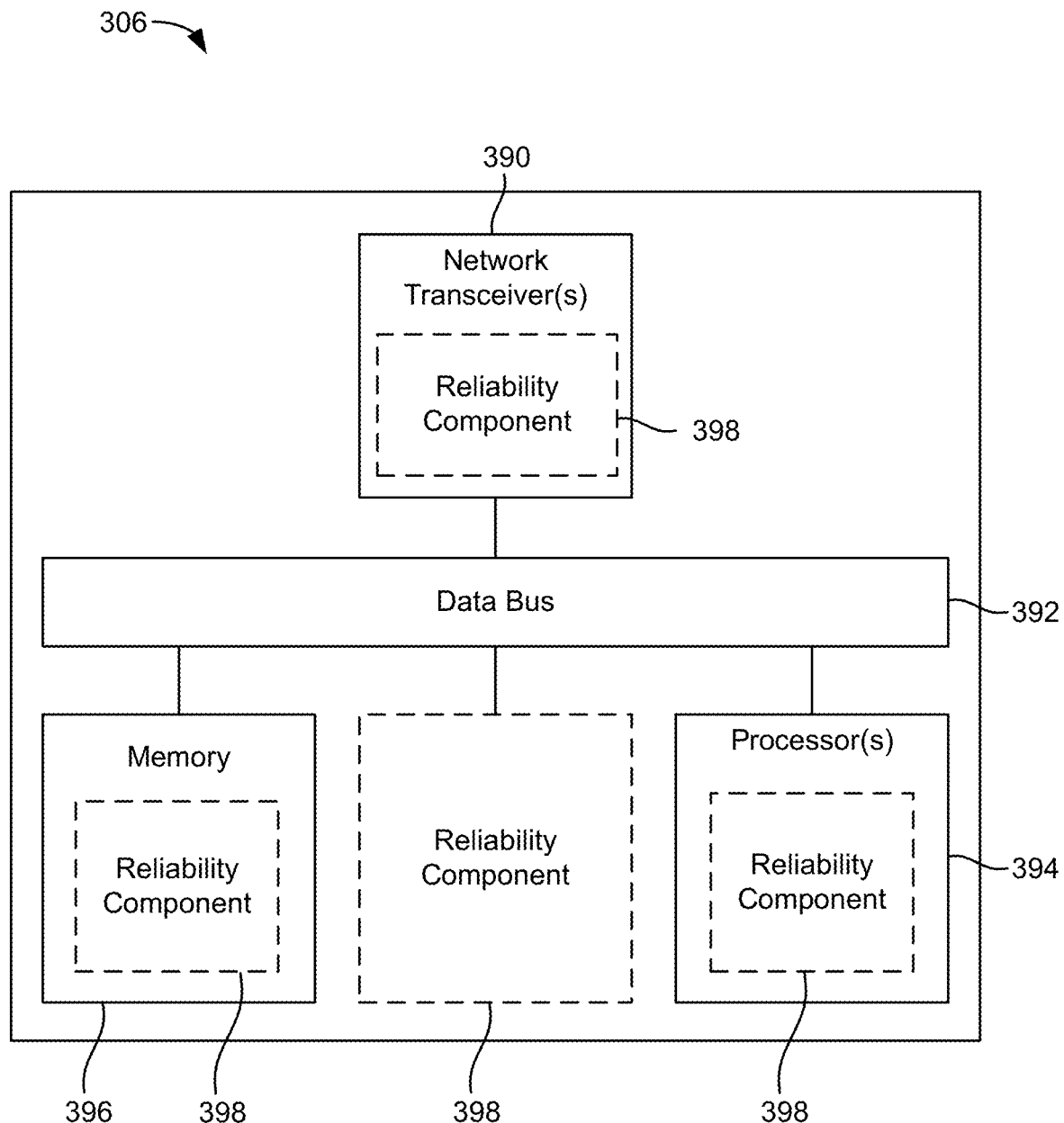

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. These components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs, etc.), via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include reliability component 342, 388, and 398, respectively. The reliability component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the reliability component 342, 388, and 398 may be external to the processors 332, 384, and 394 (e.g., part of a modem processing system, integrated with another processing system, etc.). Alternatively, the reliability component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the reliability component 342, which may be, for example, part of the one or more WWAN transceivers 310, the memory 340, the one or more processors 332, or any combination thereof, or may be a standalone component. FIG. 3B illustrates possible locations of the reliability component 388, which may be, for example, part of the one or more WWAN transceivers 350, the memory 386, the one or more processors 384, or any combination thereof, or may be a standalone component. FIG. 3C illustrates possible locations of the reliability component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through the UE's 302 respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through the receiver's 352 respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. However, the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the reliability component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
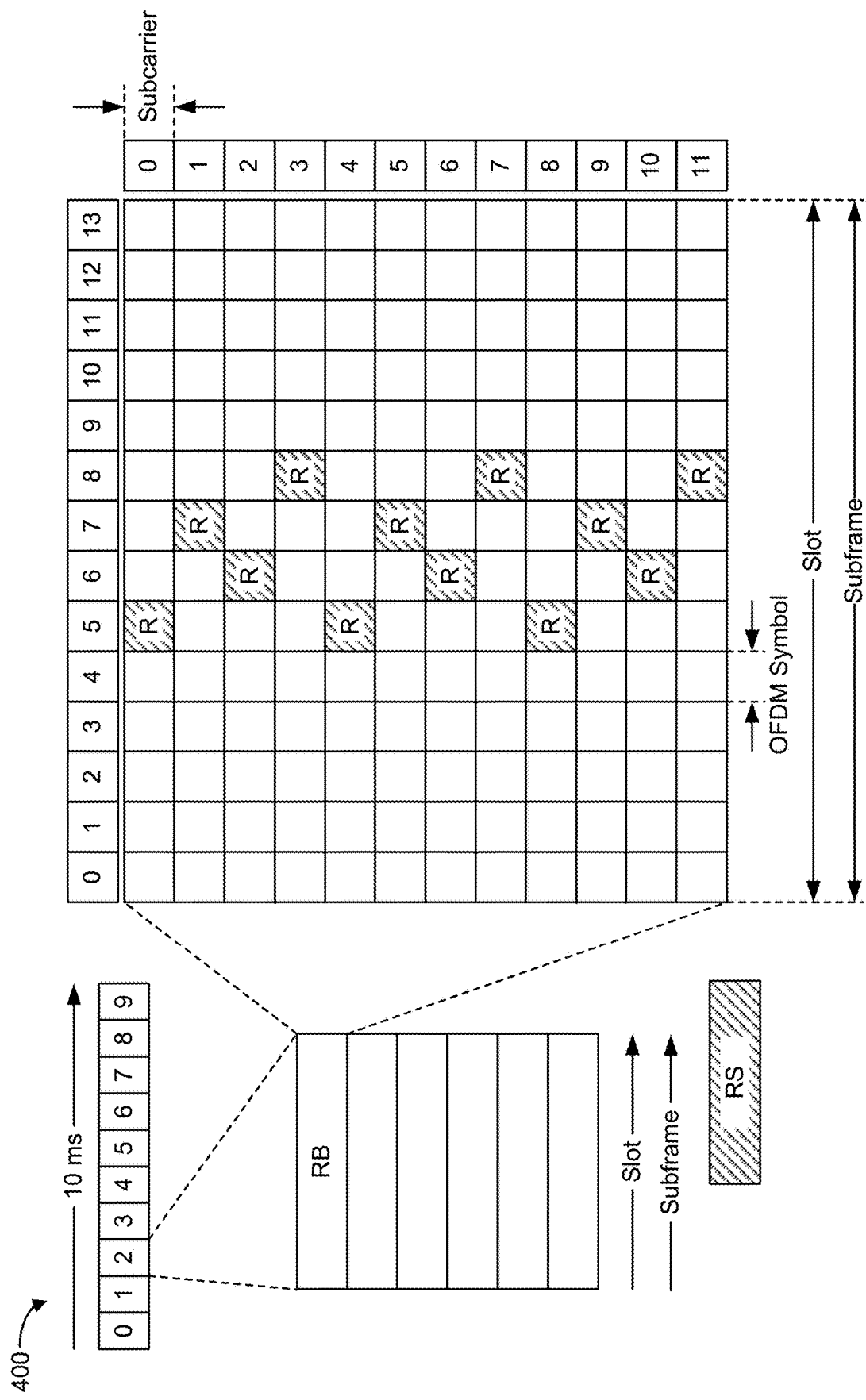
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but the BWP may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with the PDCCH's own DMRS. This enables UE-specific beamforming for the PDCCH.

In the example of FIG. 5, there is one CORESET per BWP, and the CORESET spans three symbols (although the CORESET may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, the CORESET need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

The following are the currently supported DCI formats. Format 0-0: fallback for scheduling of PUSCH; Format 0-1: non-fallback for scheduling of PUSCH; Format 1-0: fallback for scheduling of PDSCH; Format 1-1: non-fallback for scheduling of PDSCH; Format 2-0: notifying a group of UEs of the slot format; Format 2-1: notifying a group of UEs of the PRB(s) and OFDM symbol(s) where the UEs may assume no transmissions are intended for the UEs; Format 2-2: transmission of TPC commands for the physical uplink control channel (PUCCH) and PUSCH; and Format 2-3: transmission of a group of SRS requests and TPC commands for SRS transmissions. Note that a fallback format is a default scheduling option that has non-configurable fields and supports basic NR operations. In contrast, a non-fallback format is flexible to accommodate NR features.

As will be appreciated, a UE demodulates (also referred to as "decodes") the PDCCH in order to read the DCI, and thereby obtains the scheduling of resources allocated to the UE on the PDSCH and PUSCH. If the UE fails to demodulate the PDCCH, then the UE will not be able to determine the locations of the PDSCH resources and will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and every PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is expected to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8). Specifically, for the UE-specific search spaces, aggregation level '1' has six PDCCH candidates per slot and a size of six CCEs. Aggregation level '2' has six PDCCH candidates per slot and a size of 12 CCEs. Aggregation level '4' has two PDCCH candidates per slot and a size of eight CCEs. Aggregation level '8' has two PDCCH candidates per slot and a size of 16 CCEs. For the common search spaces, aggregation level '4' has four PDCCH candidates per slot and a size of 16 CCEs. Aggregation level '8' has two PDCCH candidates per slot and a size of 16 CCEs.

Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown above, if the aggregation level is '4' and the number of PDCCH candidates in a slot is '2,' then the size of the search space is '8' (i.e., 4×2=8).

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre)configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

Figure 6A:
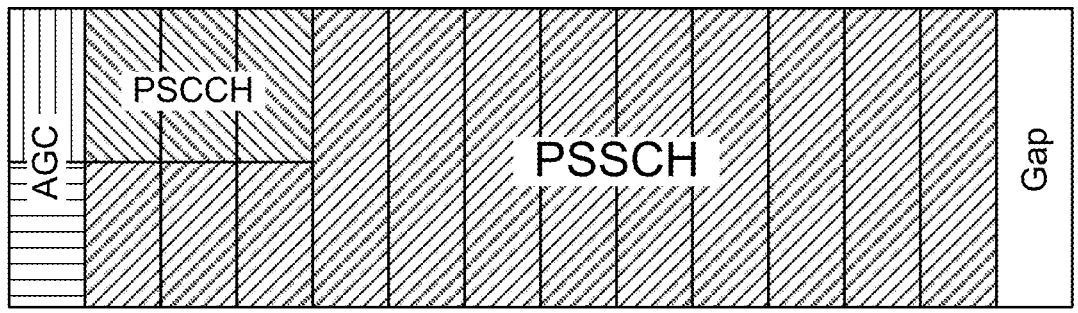
FIGS. 6A and 6B are diagrams of example sidelink slot structures with and without feedback resources, according to aspects of the disclosure.

NR sidelinks support hybrid automatic repeat request (HARQ) retransmission. FIG. 6A is a diagram 600 of an example slot structure without feedback resources, according to aspects of the disclosure. In the example of FIG. 6A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre)configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 6A by the vertical and horizontal hashing. As shown in FIG. 6A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user date for the UE. In the example of FIG. 6A, the PSCCH occupies half the bandwidth of the sub-channel and only three symbols. Finally, a gap symbol is present after the PSSCH.

Figure 6B:
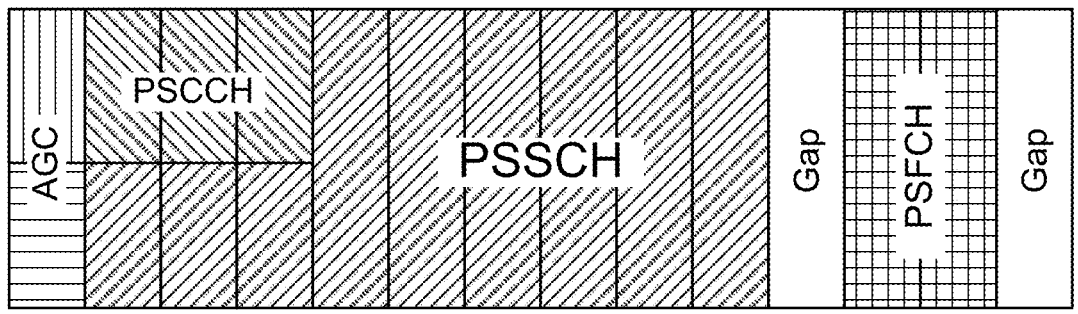

FIG. 6B is a diagram 650 of an example slot structure with feedback resources, according to aspects of the disclosure. In the example of FIG. 6B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 6B is similar to the slot structure illustrated in FIG. 6A, except that the slot structure illustrated in FIG. 6B includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

The PSCCH carries sidelink control information (SCI). First stage SCI (referred to as "SCI-1") is transmitted on the PSCCH and contains information for resource allocation and decoding second stage SCI (referred to as "SCI-2"). SCI-2 is transmitted on the PSSCH and contains information for decoding the data that will be transmitted on the shared channel (SCH) of the sidelink. SCI-1 information is decodable by all UEs, whereas SCI-2 information may include formats that are only decodable by certain UEs. This ensures that new features can be introduced in SCI-2 while maintaining resource reservation backward compatibility in SCI-1.

Figure 7:
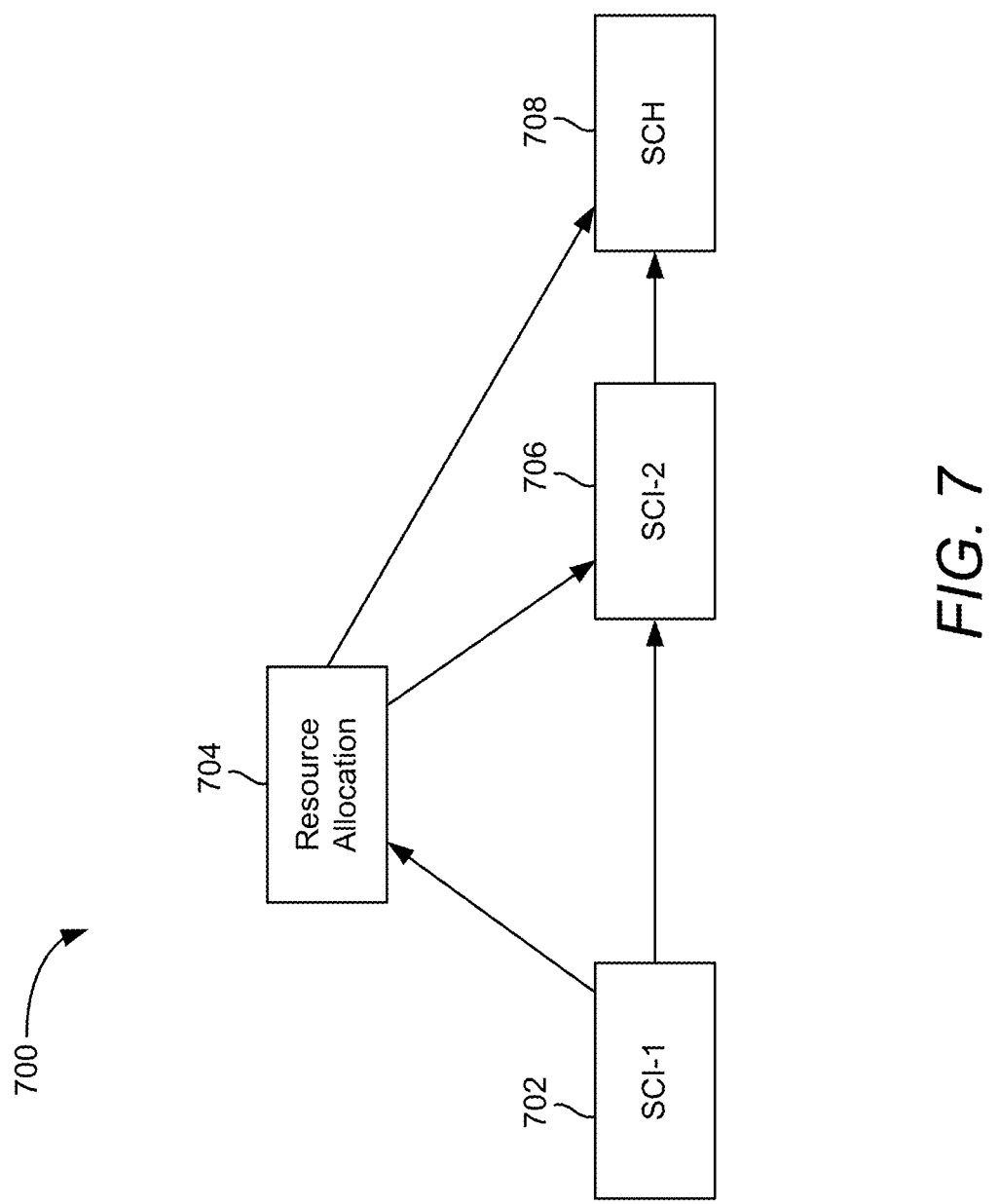
FIG. 7 is a diagram showing how a shared channel (SCH) is established on a sidelink between two or more UEs, according to aspects of the disclosure.

Both SCI-1 and SCI-2 use the PDCCH polar coding chain, illustrated in FIG. 7. FIG. 7 is a diagram 700 showing how the SCH is established on a sidelink between two or more UEs, according to aspects of the disclosure. Specifically, information in the SCI-1 702 is used for resource allocation 704 (by the network or the involved UEs) for the SCI-2 706 and SCH 708. In addition, information in the SCI-1 702 is used to determine/decode the contents of the SCI-2 706 transmitted on the allocated resources. Thus, a receiver UE uses both the resource allocation 704 and the SCI-1 702 to decode the SCI-2 706. Information in the SCI-2 706 is then used to determine/decode the SCH 708.

For downlink communication, PDCCH repetition has been introduced to improve the reliability of PDCCH reception at the UE. PDCCH repetition may be in different search space sets associated with corresponding CORESETs (with different transmission configuration indicator (TCI) states). The repeated PDCCH have the same DCI payload, the same application level (AL), and the same coded bits. In addition, the two PDCCH candidates are explicitly linked, and the UE is aware of the linkage before decoding.

In some cases, however, the communication link between the base station and the UE may be weak or impaired, in which case, the UE may not reliably receive the PDCCH/DCI even with PDCCH repetition. Using a sidelink to relay the PDCCH may enhance reliability because the target UE may have a stronger or more reliable link with the other sidelink UE. However, a simple relay of the PDCCH over the sidelink may not be sufficient. For example, the target UE needs the search space configuration that is implicitly signaled in the Uu DCI from the base station. As such, when the DCI is not signaled using Uu signaling and is instead signaled via sidelink, the information regarding the search space configuration should still be communicated to the target UE, otherwise the target UE will not be able to properly use the DCI grant received over the sidelink.

The present disclosure provides techniques to improve PDCCH reliability using sidelink communications. In an aspect, a base station sends the DCI payload for a target UE to a relay UE. The relay UE can then use the PSSCH between the target UE and the relay UE to relay the DCI payload to the target UE, and to indicate information about the search space for the DCI. In that way, reliability of PDCCH reception at the target UE is improved, as the target UE will receive the PDCCH from the sidelink UE, regardless of whether or not the target UE also receives the PDCCH from the base station. This is illustrated in FIG. 8.

Figure 8:
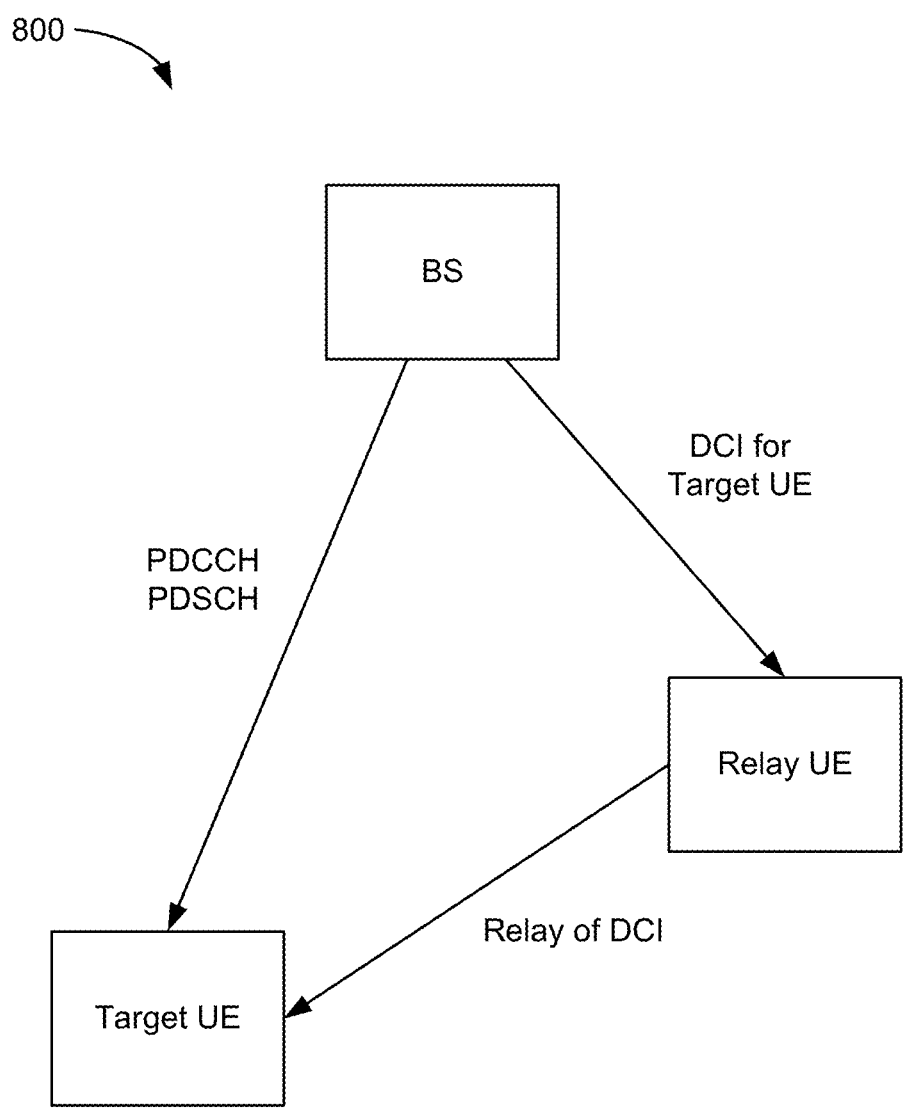
FIG. 8 is a diagram illustrating a scenario in which a base station uses a relay UE to relay downlink control information (DCI) to a target UE, according to aspects of the disclosure.

FIG. 8 is a diagram 800 illustrating a scenario in which a base station uses a relay UE to relay DCI to a target UE, according to aspects of the disclosure. As shown in FIG. 8, the base station (BS) transmits downlink information to the target UE over the PDCCH and PDSCH. The PDCCH may include DCI for the target UE. To improve reliability of DCI reception at the target UE, the base station also transmits the DCI payload for the target UE to the relay UE using, for example, PDCCH, MAC-CE, or RRC messaging. The relay UE uses the PSSCH established between the target UE and the relay UE to relay the DCI payload to the target UE. Although not illustrated in FIG. 8, as noted above, the base station may also transmit information about the search space for the DCI to the relay UE, which may then relay the information to the target UE over the PSSCH.

Figure 9A:
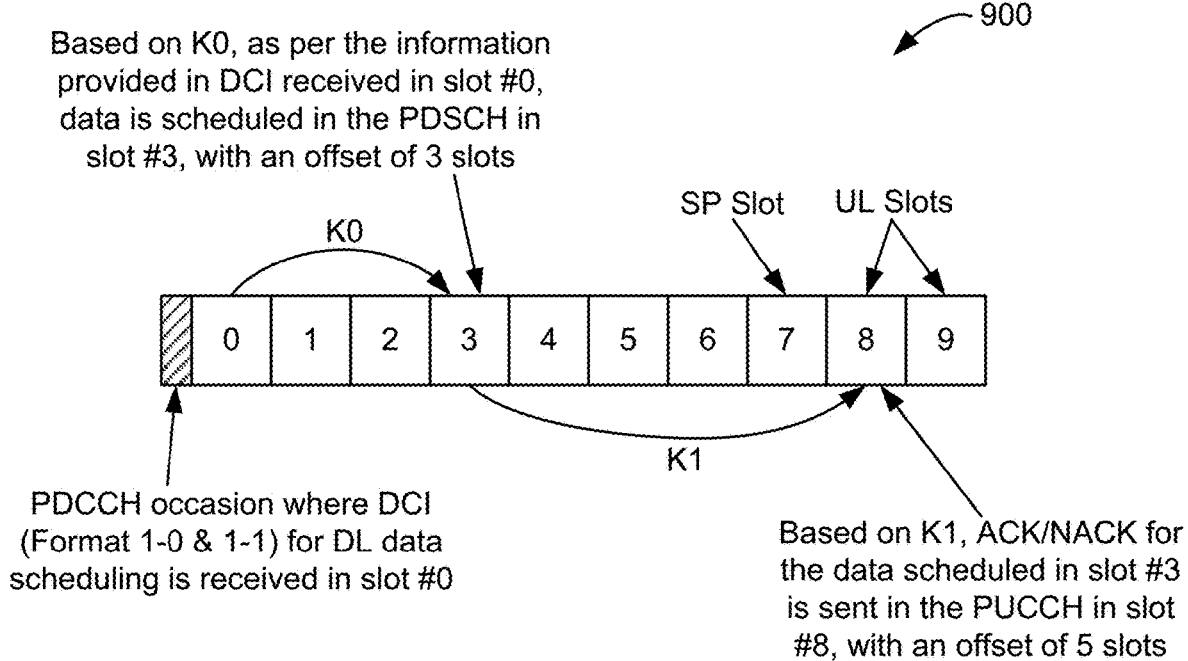
FIGS. 9A and 9B illustrate how a UE interprets K values when the base station allocates time domain resources per UE.
Figure 9B:
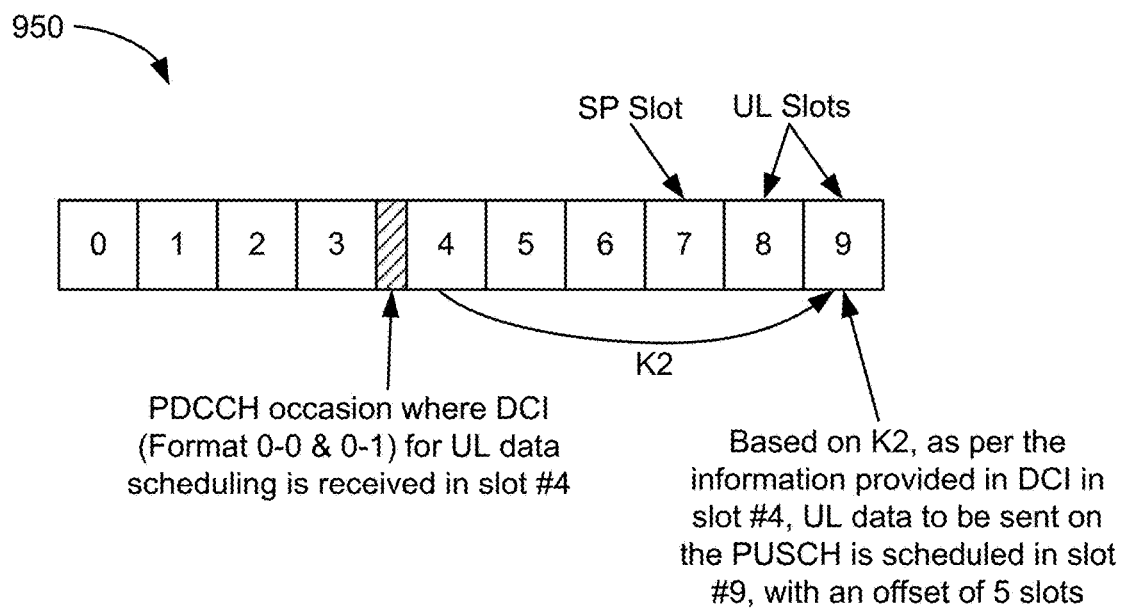

To determine the resources for the PDSCH and PUCCH (e.g., for acknowledgments) granted by the DCI, information about the search space for the DCI is used. This information includes the slot and symbol of the DCI and the CCE used for the DCI. There are three 'K' values that govern time domain resource allocation (TDRA) at the slot and symbol level. FIGS. 9A and 9B illustrate how a UE interprets each of these K values when the base station allocates time domain resources per UE.

As shown in diagram 900 of FIG. 9A, the parameter K0 is the offset between the downlink (DL) slot where the PDCCH (i.e., DCI) for downlink scheduling is received (slot #0 in the example of FIG. 9A) and the downlink slot where the PDSCH data is scheduled (slot #3 in the example of FIG. 9A). That is, the PDSCH slot is K0 slots after the slot where the DCI is received. The parameter K0 for the PDSCH is provided as part of the TDRA field of the DCI. The parameter K1 is the offset between the downlink slot where the data is scheduled on the PDSCH (slot #3 in the example of FIG. 9A) and the uplink (UL) slot where the acknowledgment/negative acknowledgment (ACK/NACK) feedback for the scheduled PDSCH data is to be sent (slot #8 in the example of FIG. 9A).

As shown in diagram 950 of FIG. 9B, the parameter K2 is the offset between the downlink slot where the PDCCH (DCI) for uplink scheduling is received (slot #4 in the example of FIG. 9B) and the uplink slot where the uplink data is to be sent on the PUSCH (slot #9 in the example of FIG. 9B). That is, the PUSCH slot is K2 slots after the slot where the DCI is received. The parameter K2 for the PUSCH is provided as part of the TDRA field of the DCI.

The PUCCH resource for ACK/NACK is determined by a 3-bit PUCCH resource indicator (PRI) field in the DCI, and potentially by one or two additional bits derived implicitly from the resource on which the DCI is received. Implicit derivation uses the number of CCEs in the CORESET and the index of the first CCE of the received DCI in the CORESET. The bits form the index of the PUCCH resource in the PUCCH resource set. The first of the four PUCCH resource sets may have up to 32 PUCCH resources, and the implicit bits are used when there are more than 8 PUCCH resources.

The DCI transmitted over the Uu interface has this implicit information (e.g., the number of CCEs in the CORESET and the index of the first CCE of the received DCI in the CORESET) in the search space configuration. As such, when relaying DCI to a target UE via a relay UE, this implicit information is included over the sidelink for cases where the target UE decodes DCI from the relay UE (e.g., and does not decode DCI from the base station).

As a first technique described herein, each Uu search space candidate may be explicitly linked to a sidelink SCI position. The linking information is configured at the target UE through RRC or MAC-CE messaging. The above-noted implicit information can then be derived from the sidelink version of the DCI through the linking. Note that for Uu DCI, two PDCCH candidates are explicitly linked via a one-to-one mapping between the search space candidates in two linked search space sets with the same DCI payload, the same AL, and the same coded bits.

Note that a "search space candidate" is a search space that may include the DCI for the target UE. A "search space set" is a group of one or more search space candidates.

As a second technique described herein, there is no explicit linking information configured at the target UE. Instead, the implicit information described above is transmitted over the sidelink channel between the relay UE and the target UE in addition to the DCI payload.

Referring to the first technique in greater detail, the base station can determine whether to transmit DCI to the target UE over the Uu link only, sidelink only via the relay UE, or both Uu link and sidelink. The target UE may decode the DCI received over the Uu link, the sidelink, or both. From the target UE's point of view, there may be two DCIs received, one over the Uu link and one over the sidelink, when the base station transmits DCI over both the Uu link and sidelink via the relay UE.

Linking each Uu search space candidate to a sidelink SCI position may enable soft combining. From the linking, the target UE can obtain information about the search space, CORESET, and CCE, which the target UE can then use to determine the scheduled resource(s) (e.g., PDSCH, PUCCH ACK/NACK, or PUCCH) even if the target UE is only able to decode the DCI relayed over the sidelink and not the Uu link. The PUCCH resource(s) can be determined by the number of CCEs and the first index of the CCEs. The time reference point for determining the parameters K0, K2, and "timeDurationForQCL" (for the TCI state) is to be defined, and is discussed further below. To enable soft combining, the relay UE uses the polar code to encode the DCI payload to be relayed.

Figure 10:
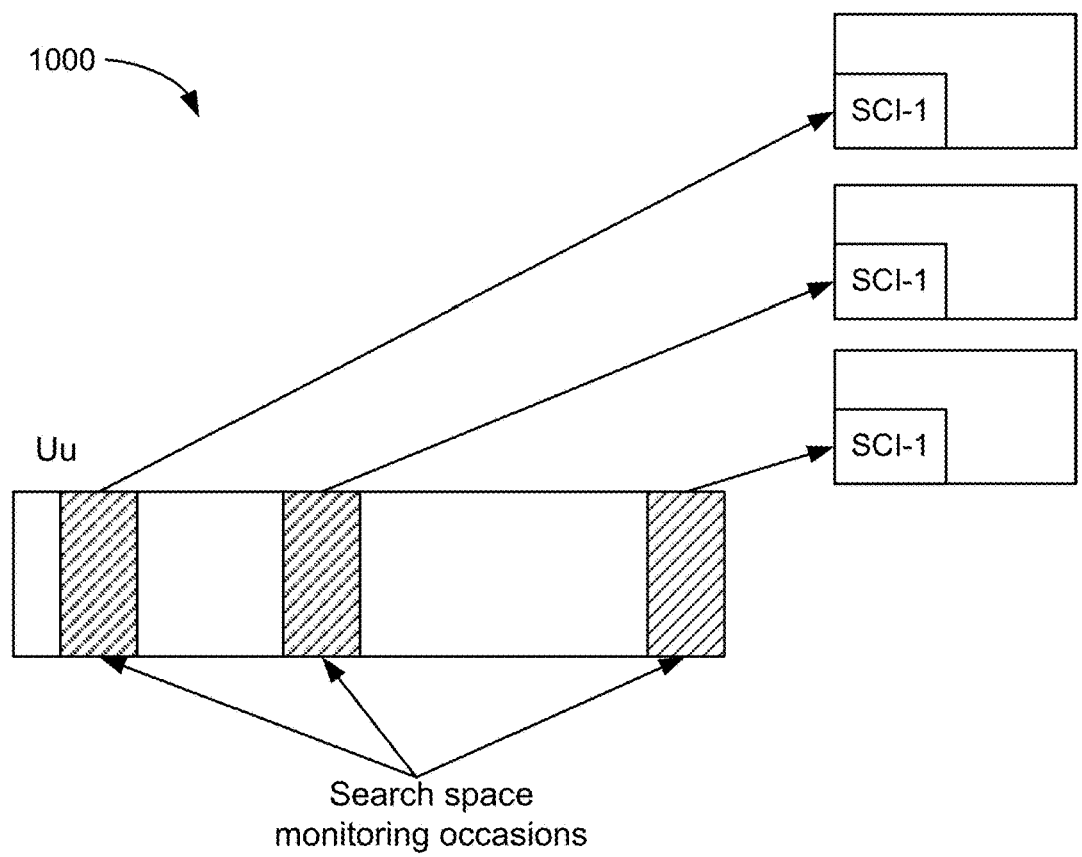
FIGS. 10 and 11 are diagrams illustrating additional details about the explicit linking between search space candidate and sidelink sidelink control information (SCI) position, according to aspects of the disclosure.
Figure 11:
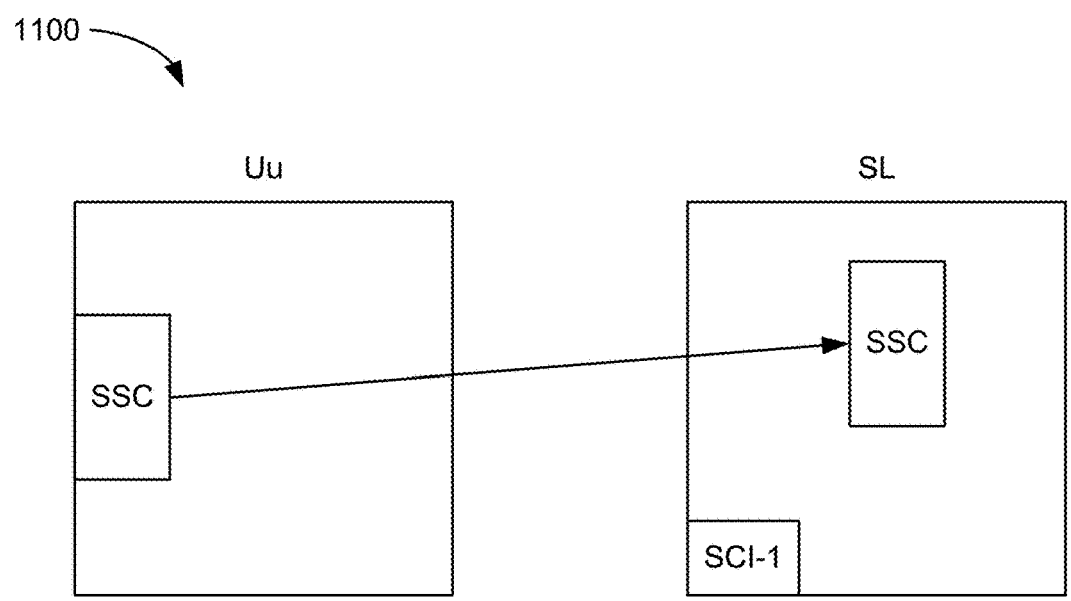

FIGS. 10 and 11 are diagrams illustrating additional details about the explicit linking between search space candidate and sidelink SCI position, according to aspects of the disclosure. In diagram 1000 of FIG. 10, there are three PDCCH monitoring occasions (i.e., search space monitoring occasions, or search space candidates) in a slot. Each PDCCH monitoring occasion in the slot maps to an SCI-1 position in a different subchannel (the block within which each SCI-1 is located represents a subchannel).

In the PSSCH of the sidelink channel, a set of time and/or frequency resources is defined that can be used for PDCCH repetition. These resources may be referred to as a "sidelink CORESET." For example, the resources in the sidelink CORESET may follow the SCI-2, with resource elements of the sidelink CORESET arranged in frequency first order.

Also in the sidelink, a number of sidelink search space candidates can be defined, which may be similar to Uu search space candidates (with AL and candidate identifier). The mapping from the sidelink search space candidates to resources in the sidelink CORESET may be similar to such a mapping on the Uu link, or the mapping may be defined differently.

As shown in diagram 1100 of FIG. 11, a one-to-one mapping is then defined between each search space candidate (labeled "SSC" in the figure) of the Uu PDCCH and each sidelink search space candidate (labeled "SSC" in the figure) on the sidelink. The sidelink search space candidate will map to resources in the sidelink CORESET. Information in the SCI will indicate whether the PSSCH contains the sidelink search space candidate for PDCCH repetition. The remaining PSSCH resources in the resource pool/subchannel can still be used for sidelink traffic.

Figure 12:
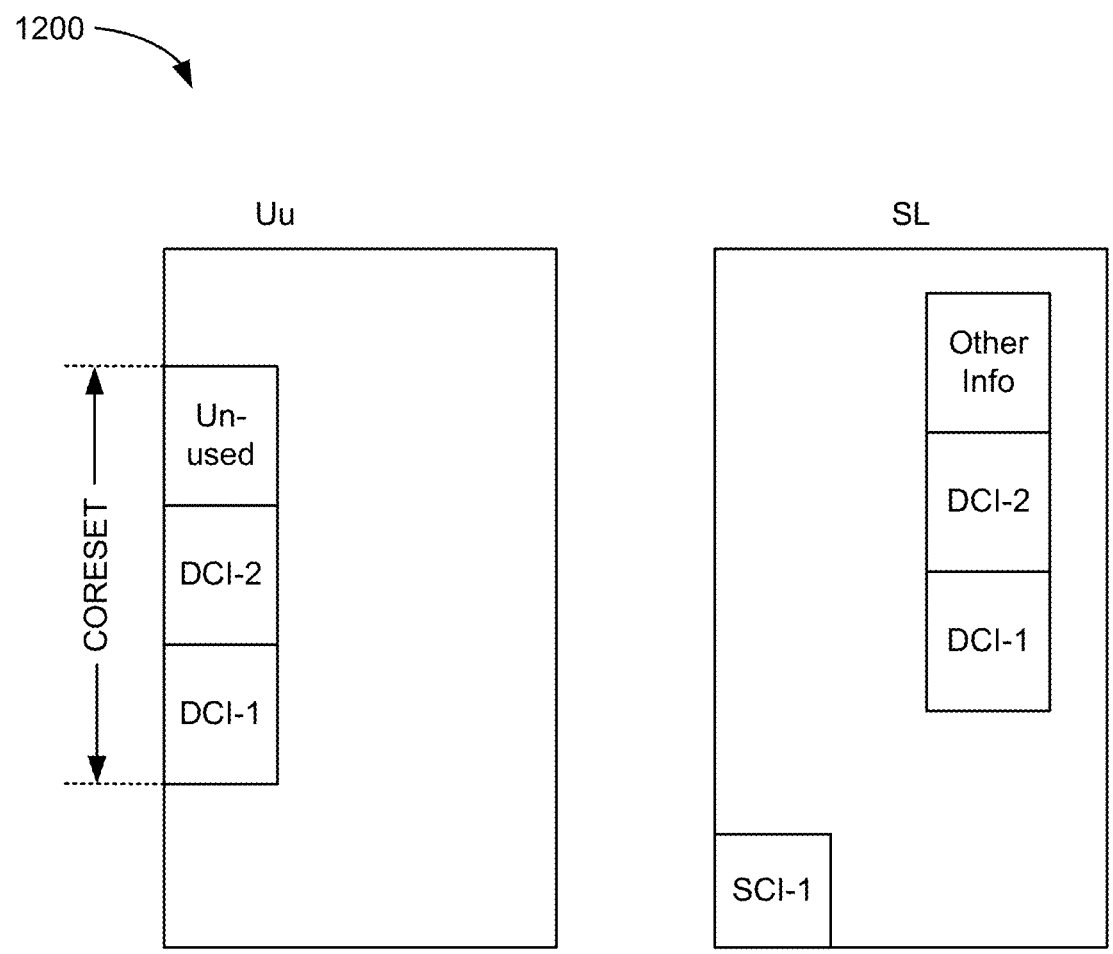
FIG. 12 is a diagram illustrating additional details for when there is no explicit linking between a search space candidate and a sidelink SCI position, according to aspects of the disclosure.

Referring now to the second technique described herein in greater detail, this technique may use selection diversity, as the payloads transmitted over the Uu link and sidelink are different. FIG. 12 is a diagram 1200 illustrating additional details for when there is no explicit linking between a search space candidate and a sidelink SCI position (e.g., no explicit linking configured at a target UE), according to aspects of the disclosure. As shown in FIG. 12, the Uu channel includes a CORESET that includes first DCI (labeled "DCI-1"), second DCI (labeled "DCI-2"), and unused resources (labeled "Unused"). As noted above, the sidelink version is to include associated information about the search space candidate (e.g., slot, symbol, AL) and CORESET (e.g., number of CCEs, first CCE index of the DCI, etc.). Thus, the sidelink channel includes the first DCI (labeled "DCI-1"), the second DCI (labeled "DCI-2"), and this additional information (labeled "Other Info").

A special bit (or flag) in SCI-1 or SCI-2 is used to indicate that this sidelink transmission is for DCI. In the example of FIG. 12, SCI-1 is used. The sidelink can use a polar code or a low-density parity check (LDPC) code to encode the DCI payload and the associated information. Here, the target UE cannot use the later arriving of the Uu and sidelink DCI as a time reference point, since the reference point is self-contained in the direct (i.e., Uu) version and the sidelink-relayed version.

Referring back to the parameter K0 in greater detail, the slot in which the DCI (for scheduling the PDSCH) is received is used as a time reference, as described above with reference to FIG. 9A. For Uu PDCCH repetition (i.e., both repetitions of the DCI are transmitted on the Uu link), if the two search space sets (for the two DCI repetitions) are in different slots, the reference time for K0 is the slot of the later (in time) search space set for determination of the PDSCH slot. Note that because the DCI is received in a search space candidate of a search space set, the time reference for K0 (or K1 or K2) may be referred to interchangeably as the slot containing the DCI, the slot containing the search space candidate, or the slot containing the search space set.

In contrast to Uu DCI repetition, for Uu and sidelink DCI repetition for the first technique described herein (i.e., explicit linking), there are different options for the reference time for K0 for the second technique. As a first option, the time reference for K0 may be the slot of the later (in time) between the search space set for the DCI on the Uu link and the search space set for the DCI on the sidelink for determination of the PDSCH slot. As a second option, the time reference for K0 may be the slot of the Uu search space candidate carrying the DCI. In other words, the reference time for K0 is (1) the later of the reception time of the DCI from the relay UE or the reception time of the DCI from the base station, or (2) always the reception time of the DCI from the base station. For the second option, if the target UE is only able to decode the DCI on the sidelink channel, then the target UE can obtain the Uu search space candidate information from the linking between the Uu and the sidelink.

Figure 13:
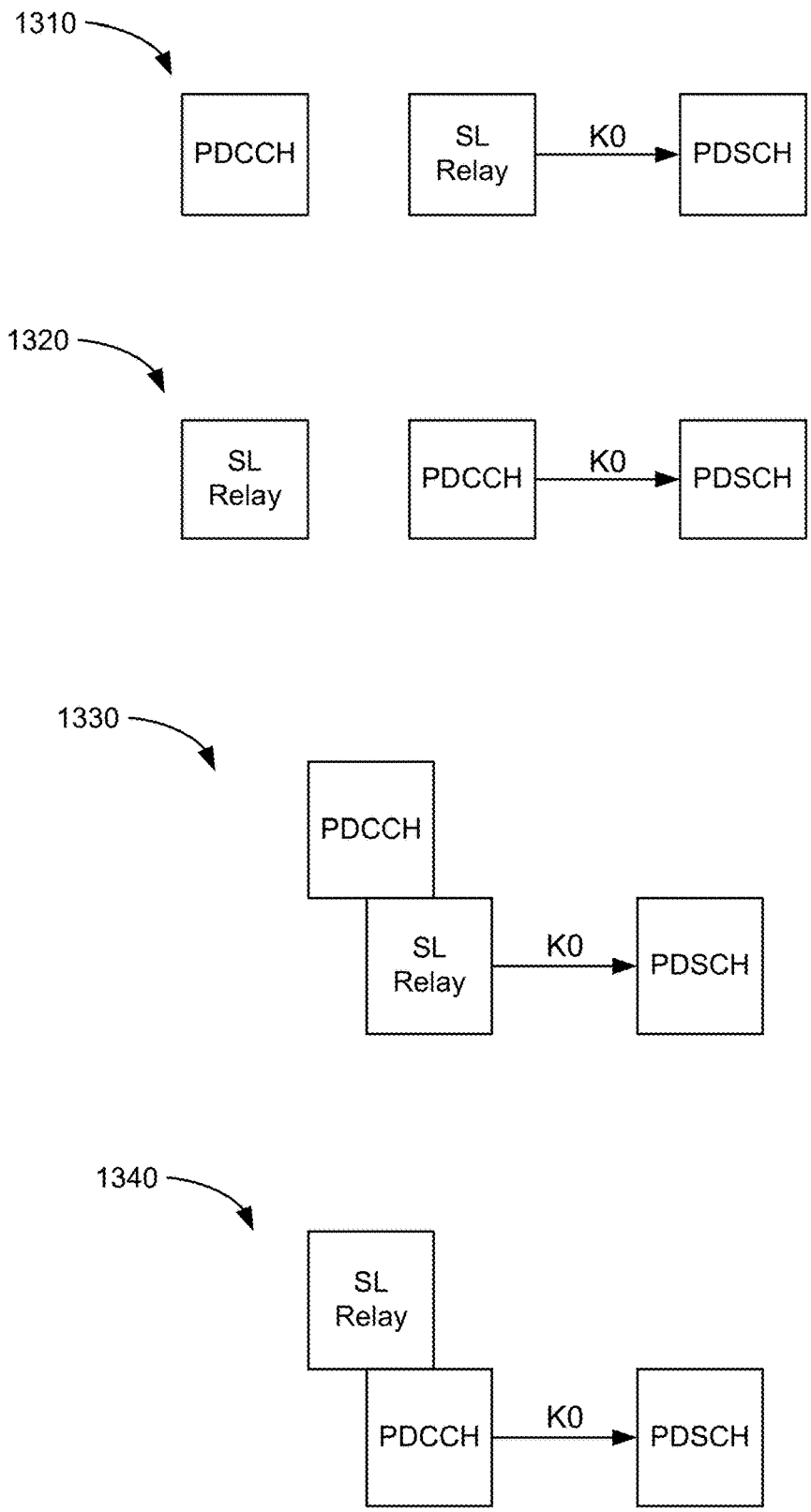
FIG. 13 illustrates example scenarios of the reference time for K0, according to aspects of the disclosure.

FIG. 13 illustrates example scenarios of the reference time for K0, according to aspects of the disclosure. In FIG. 13, blocks labeled "PDCCH" represent the time and frequency resources on which DCI from the base station is received over a Uu link. Blocks labeled "SL Relay" represent the time and frequency resources on which DCI from the relay UE is received over a sidelink.

As illustrated in diagram 1310, the DCI from the relay UE (represented by the box labeled "SL Relay") is received after the DCI from the base station (represented by the box labeled "PDCCH"), and therefore, the slot in which the DCI from the relay UE is received is used as the reference time for K0. As illustrated in diagram 1320, the DCI from the base station is received after the DCI from the relay UE, and therefore, the slot in which the DCI from the base station is received is used as the reference time for K0.

As illustrated in diagram 1330, the DCI from the relay UE is received after the DCI from the base station, and therefore, the slot in which the DCI from the relay UE is received is used as the reference time for K0. As illustrated in diagram 1340, the DCI from the base station is received after the DCI from the relay UE, and therefore, the slot in which the DCI from the base station is received is used as the reference time for K0. As illustrated by diagrams 1330 and 1340, the PDCCH and sidelink DCI slots may overlap in time (and possibly frequency, although not shown).

Referring back to the parameter K2 in greater detail, the time reference for K2 (which is a number of slots) is the slot where the DCI is detected. The reference time for N2 (which is a number of symbols) is the last symbol of the PDCCH containing the DCI. For Uu PDCCH repetition, if the two search space sets (for the two DCI repetitions) are in different slots, the reference time for K2 is the slot of the later search space set (or search space candidate or DCI) and the reference for N2 is the last symbol of the later search space set (or search space candidate or DCI). Note that after a UE receives an uplink grant, the UE takes time to prepare the PUSCH data. The parameter N2 is a factor in determining the preparation time.

In contrast to Uu DCI repetition, for Uu and sidelink DCI repetition for the first technique described herein (i.e., explicit linking), there are different options for the reference time for K2 and N2. As a first option, the reference time for K2 may be the slot of the later (in time) between the search space set for the DCI on the Uu link and the search space set for the DCI on the sidelink. The reference time for N2 would therefore be the last symbol of the later (in time) between the Uu search space set and the PSSCH carrying the repeated DCI (i.e., the search space set for the DCI on the sidelink). As a second option, the reference time for K2 and N2 may use the Uu search space candidate carrying the DCI. In other words, the reference time for K2 is the later of (1) the reception time of the DCI from the relay UE or the reception time of the DCI from the base station, or (2) always the reception time of the DCI from the base station.

Referring to the parameters K0, K2, and N2 in terms of the second technique described herein (i.e., no explicit linking), the reference time for these parameters cannot be the slot of the later (in time) of the Uu and sidelink DCI because the reference time is self-contained in both the Uu DCI and the sidelink DCI. Thus, there are different options for the reference time for the parameters K0, K2, and N2 for the DCI relayed over the sidelink.

As a first option, the reference time for K0 and K2/N2 may be the slot of the search space candidate for the Uu DCI, with the TDRA in the DCI payload pointing to the "PD(U)SCH-TimeDomainResourceAllocationList" information element (IE) (provided in assistance data). In this case, the relay UE can include an indication of the downlink slot containing the search space candidate in addition to the DCI payload. As a second option, the reference time for K0 and K2/N2 may be the slot of the search space for the sidelink relaying the DCI. In this case, the relay UE can adjust the values of K0 and K2/N2 accordingly.

Figure 14:
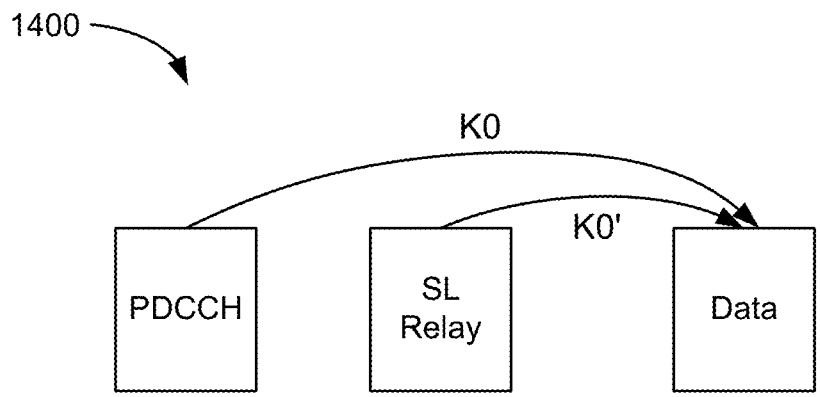
FIG. 14 is a diagram illustrating the two options for the reference time for K0, according to aspects of the disclosure.

FIG. 14 is a diagram 1400 illustrating the two options for the reference time for K0, according to aspects of the disclosure. In FIG. 14, blocks labeled "PDCCH" represent the time and frequency resources on which DCI from the base station is received over a Uu link. Blocks labeled "SL Relay" represent the time and frequency resources on which DCI from the relay UE is received over a sidelink. For the first option, the DCI from the base station (represented by the box labeled "PDCCH") is used as the reference time for K0, whereas for the second option, the DCI from the relay UE (represented by the box labeled "SL Relay") is used as the reference time for K0 (labeled K0' in the figure).

There are also different options for the PRI for the second techniques described herein (i.e., no explicit linking). As a first option, the target UE may determine the PRI from the DCI payload, the number of CCEs, and the index of the first CCE. The relay UE therefore includes this information in the sidelink transmission. As a second option, the relay UE indicates the PUCCH resource explicitly.

Referring to the TCI state in greater detail, currently, there is no TCI present in DCI. Rather, the TCI state and QCL assumption for the PDSCH is determined from the TCI state and QCL assumption for the scheduling CORESET. With sidelink DCI relaying, there may be times when the target UE cannot decode the DCI on the Uu link. With linking, the target UE will still be able to determine the scheduling CORESET. Without linking, the relay UE will include (e.g., always include) the TCI field in the sidelink version of the DCI.

The parameter "timeDurationForQCL" (the time duration during which the QCL relation between the DCI/PDCCH and the PDSCH is valid, and therefore the time during which the UE can communicate with the base station based on the QCL relation) can be calculated in different ways. For both the first and second techniques described herein, when the Uu search space slot is configured, then as a first option, the "timeDurationForQCL" may be calculated using the last symbol of the DCI received over the Uu link. As a second option, the "timeDurationForQCL" may be calculated using the last symbol of the later received DCI between the Uu link and the sidelink.

For the second technique described herein, when the Uu search space slot is not configured or indicated to the target UE, if the target UE can decode the DCI on the Uu, then the "timeDurationForQCL" may be calculated using the last symbol of the DCI received over the Uu link. If the target UE can only decode the DCI on the sidelink, then the "timeDurationForQCL" may be calculated using last symbol of the DCI received over the sidelink.

In some cases, there may be a time domain restriction on scheduling the PDSCH. Currently, the scheduled PDSCH cannot start earlier than the first symbol of the scheduling PDCCH. With Uu PDCCH repetition, the scheduled PDSCH cannot start earlier than the last first symbol among the search spaces. However, with Uu and sidelink DCI repetition, for both the first and second techniques described herein, the scheduled PDSCH cannot start earlier than the last first symbol among the search space and corresponding SCI-1 (i.e., the SCI-1 linked to the Uu search space).

Figure 15:
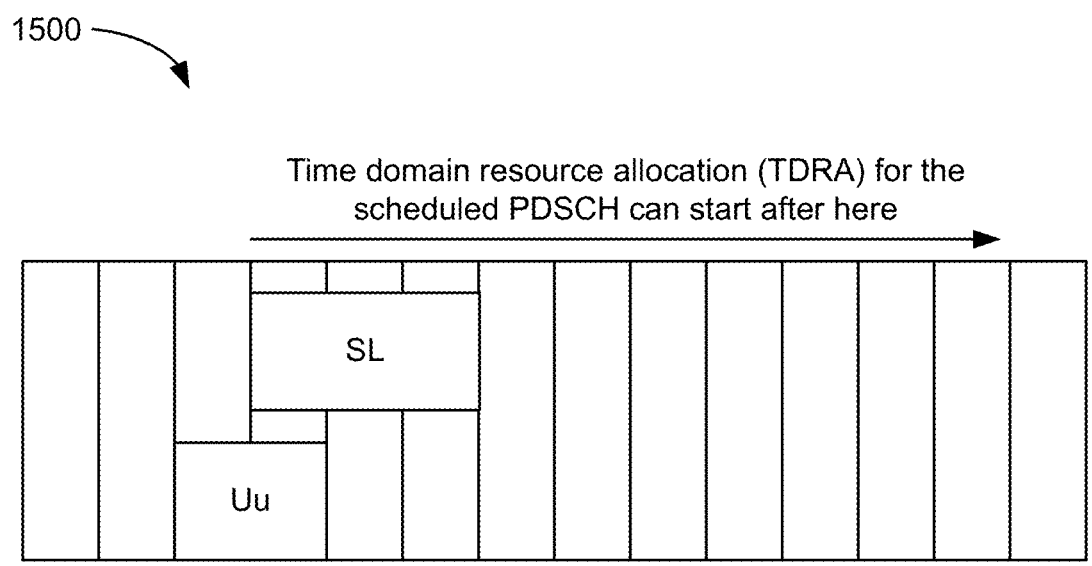
FIG. 15 is a diagram illustrating time domain resource allocation for a scheduled physical downlink shared channel (PDSCH), according to aspects of the disclosure.

FIG. 15 is a diagram 1500 illustrating time domain resource allocation for a scheduled PDSCH, according to aspects of the disclosure. More specifically, FIG. 15 illustrates a slot (of 14 symbols) in which both Uu DCI (represented by the box labeled "Uu") and sidelink DCI (represented by the box labeled "SL") are received. Because there is Uu and sidelink DCI repetition, the scheduled PDSCH cannot start before the first symbol of the later (in time) of the Uu DCI and the sidelink DCI. Thus, the resource allocation for the scheduled PDSCH can begin at the start of the sidelink DCI (as illustrated by the arrow).

Figure 16:
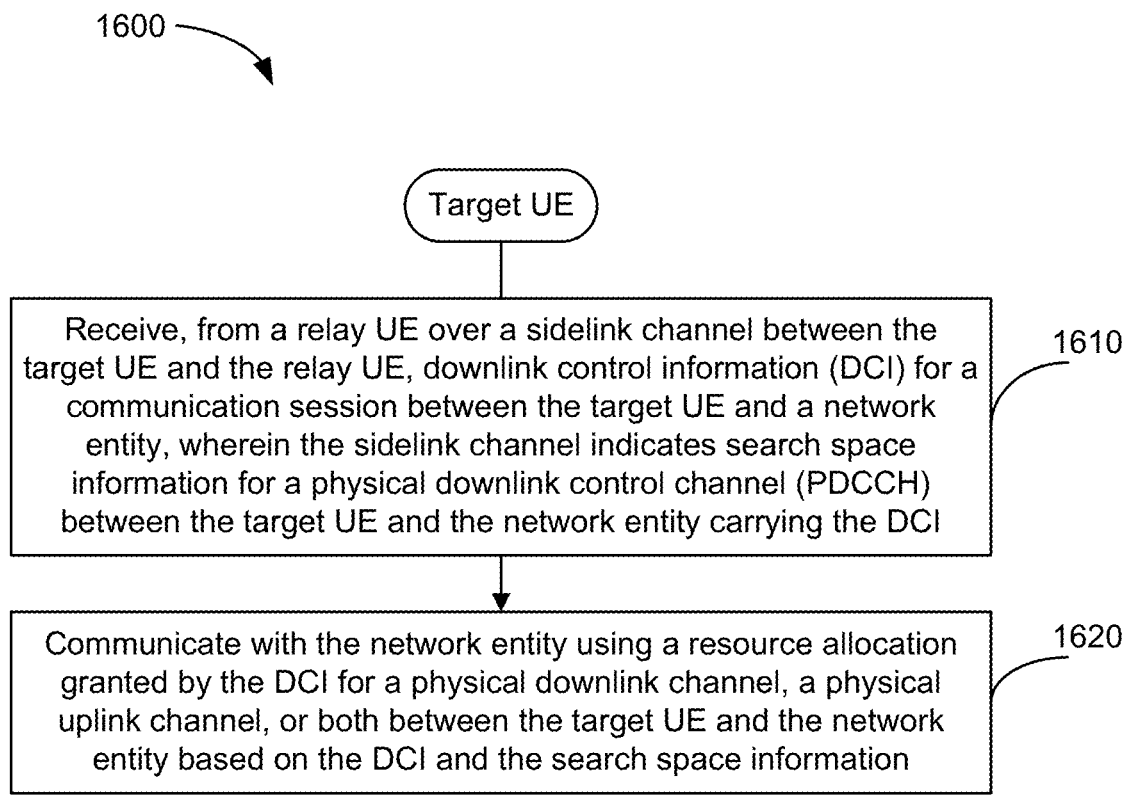
FIGS. 16 to 18 illustrate example methods of wireless communication, according to aspects of the disclosure.

FIG. 16 illustrates an example method 1600 of wireless communication, according to aspects of the disclosure. In an aspect, method 1600 may be performed by a target UE (e.g., any of the UEs described herein).

At 1610, the target UE receives, from a relay UE over a sidelink channel between the target UE and the relay UE, DCI for a communication session between the target UE and a network entity (e.g., a base station or a unit of a disaggregated base station), wherein the sidelink channel indicates search space information for a PDCCH between the target UE and the network entity carrying the DCI. In an aspect, operation 1610 may be performed by the one or more WWAN transceivers 310, the one or more processors 332, memory 340, and/or reliability component 342, any or all of which may be considered means for performing this operation.

At 1620, the target UE communicates with the network entity using a resource allocation granted by the DCI for a physical downlink channel, a physical uplink channel, or both between the target UE and the network entity based on the DCI and the search space information. In an aspect, operation 1620 may be performed by the one or more WWAN transceivers 310, the one or more processors 332, memory 340, and/or reliability component 342, any or all of which may be considered means for performing this operation.

As will be appreciated, a technical advantage of method 1600 is improved reliability of DCI reception at the target UE, insofar as the target UE will receive the PDCCH from the relay UE regardless of whether or not the target UE also receives the PDCCH from the network entity. The target UE will then be able to communicate with the network entity even if the target UE does not receive the PDCCH from the network entity.

Figure 17:
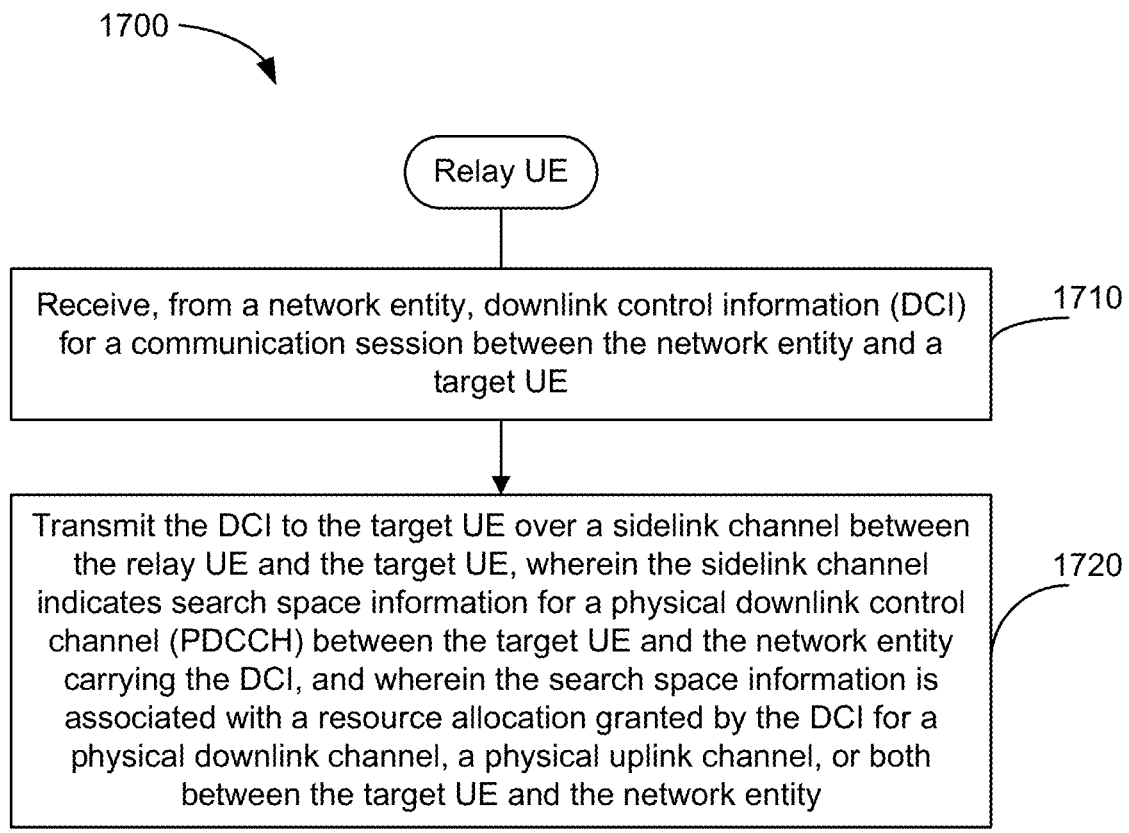

FIG. 17 illustrates an example method 1700 of wireless communication, according to aspects of the disclosure. In an aspect, method 1700 may be performed by a relay UE (e.g., any of the UEs described herein).

At 1720, the relay UE receives, from a network entity, DCI for a communication session between the network entity and a target UE. In an aspect, operation 1710 may be performed by the one or more WWAN transceivers 310, the one or more processors 332, memory 340, and/or reliability component 342, any or all of which may be considered means for performing this operation.

At 1720, the relay UE transmits the DCI to the target UE over a sidelink channel between the relay UE and the target UE, wherein the sidelink channel indicates search space information for a PDCCH between the target UE and the network entity carrying the DCI, and wherein the search space information is associated with a resource allocation granted by the DCI for a physical downlink channel, a physical uplink channel, or both between the target UE and the network entity. In an aspect, operation 1720 may be performed by the one or more WWAN transceivers 310, the one or more processors 332, memory 340, and/or reliability component 342, any or all of which may be considered means for performing this operation.

As will be appreciated, a technical advantage of method 1700 is enabling improved reliability for DCI reception to the target UE, insofar as the relay UE transmits the PDCCH to the target UE regardless of whether or not the target UE also receives the PDCCH from the network entity.

Figure 18:
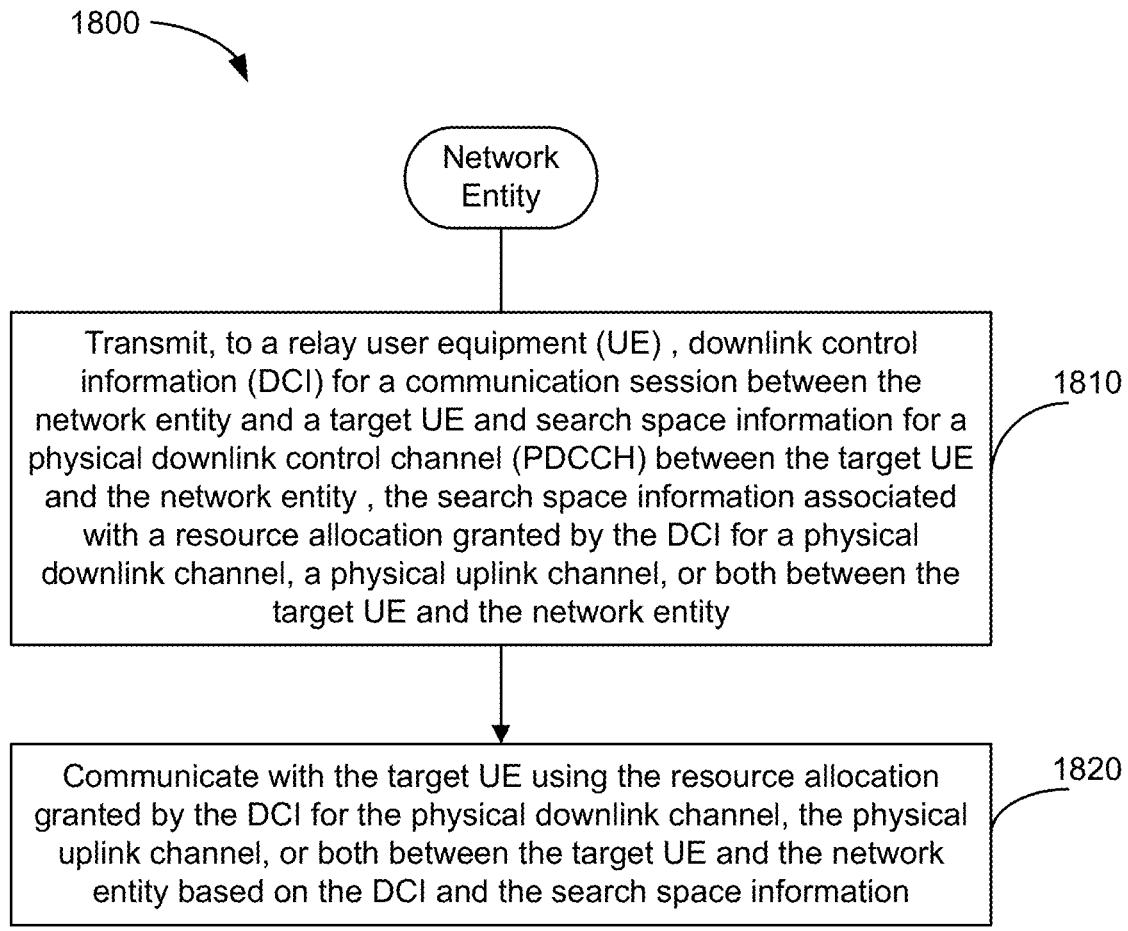

FIG. 18 illustrates an example method 1800 of wireless communication, according to aspects of the disclosure. In an aspect, method 1800 may be performed by a network entity (e.g., any of the network entities described herein).

At 1810, the network entity transmits, to a relay UE, DCI for a communication session between the network entity and a target UE and search space information for a PDCCH between the target UE and the network entity, the search space information associated with a resource allocation granted by the DCI for a physical downlink channel, a physical uplink channel, or both between the target UE and the network entity. In an aspect, operation 1810 may be performed by the one or more WWAN transceivers 350, the one or more processors 384, memory 386, and/or reliability component 388, any or all of which may be considered means for performing this operation.

At 1820, the network entity communicates with the target UE using the resource allocation granted by the DCI for the physical downlink channel, the physical uplink channel, or both between the target UE and the network entity based on the DCI and the search space information. In an aspect, operation 1820 may be performed by the one or more WWAN transceivers 350, the one or more processors 384, memory 386, and/or reliability component 388, any or all of which may be considered means for performing this operation.

As will be appreciated, a technical advantage of method 1800 is providing improved reliability of DCI reception to the target UE, insofar as the network entity can ensure that the target UE will receive the PDCCH from the sidelink UE regardless of whether or not the target UE also receives the PDCCH from the network entity. The network entity will then be able to communicate with the target UE even if the target UE does not receive the PDCCH from the network entity.

In the detailed description above, different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. Other example clauses can also include a combination of the dependent clause aspect(s) with the subject matter of any other dependent clause or independent clause or a combination of any feature with other dependent and independent clauses. The various aspects disclosed herein expressly include these combinations, unless explicitly expressed or readily inferred that a specific combination is not intended (e.g., contradictory aspects, such as defining an element as both an electrical insulator and an electrical conductor). Furthermore, aspects of a clause can be included in any other independent clause, even if the clause is not directly dependent on the independent clause.

Implementation examples are described in the following numbered clauses:

Clause 1. A method of wireless communication performed by a relay user equipment (UE), comprising: receiving, from a network entity, downlink control information (DCI) for a communication session between the network entity and a target UE; and transmitting the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

Clause 2. The method of clause 1, wherein the sidelink channel indicates the search space information based at least in part on a position of sidelink control information (SCI) on the sidelink channel.

Clause 3. The method of clause 2, wherein: the SCI comprises an SCI-1, and a position of the SCI-1 on a subchannel of the sidelink channel indicates a PDCCH monitoring occasion.

Clause 4. The method of any of clauses 2 to 3, wherein a set of time and/or frequency resources is defined on a physical sidelink shared channel (PSSCH) of the sidelink channel for PDCCH repetition.

Clause 5. The method of clause 4, wherein the set of time and/or frequency resources follows an SCI-2 of the sidelink channel.

Clause 6. The method of any of clauses 2 to 5, wherein: a plurality of sidelink search space candidates is defined for the sidelink channel, and each of the plurality of sidelink search space candidates is mapped to a Uu search space candidate for the PDCCH.

Clause 7. The method of any of clauses 2 to 6, wherein the SCI indicates whether a PSSCH of the sidelink channel includes a search space set for PDCCH repetition.

Clause 8. The method of any of clauses 2 to 7, wherein the search space information comprises: a search space candidate for the PDCCH, control resource set (CORESET) information for the PDCCH, control channel element (CCE) information for the CORESET, or any combination thereof.

Clause 9. The method of clause 1, further comprising: transmitting the search space information to the target UE over the sidelink channel, wherein the sidelink channel indicates the search space information based at least in part on transmission of the search space information over the sidelink channel.

Clause 10. The method of clause 9, wherein a flag in SCI on the sidelink channel indicates that the sidelink channel includes the search space information.

Clause 11. The method of clause 10, wherein the flag comprises: a bit in SCI-1 of the SCI, or a bit in SCI-2 of the SCI.

Clause 12. The method of any of clauses 9 to 11, wherein the DCI is encoded using a polar code or a low-density parity check (LDPC) code.

Clause 13. The method of any of clauses 9 to 12, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 14. The method of any of clauses 1 to 13, wherein the DCI for the target UE is received via a PDCCH between the relay UE and the network entity, medium access control control element (MAC-CE) signaling, or radio resource control (RRC) signaling.

Clause 15. The method of any of clauses 1 to 14, wherein the sidelink channel comprises a physical sidelink shared channel (PSSCH).

Clause 16. A method of wireless communication performed by a target user equipment (UE), comprising: receiving, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and communicating with the network entity using a resource allocation granted by the DCI for a physical downlink channel, a physical uplink channel, or both between the target UE and the network entity based on the DCI and the search space information.

Clause 17. The method of clause 16, wherein the sidelink channel indicates the search space information based at least in part on a position of sidelink control information (SCI) on the sidelink channel.

Clause 18. The method of clause 17, wherein: the SCI comprises an SCI-1, and a position of the SCI-1 on a subchannel of the sidelink channel indicates a PDCCH monitoring occasion.

Clause 19. The method of any of clauses 17 to 18, wherein a set of time and/or frequency resources is defined on a physical sidelink shared channel (PSSCH) of the sidelink channel for PDCCH repetition.

Clause 20. The method of clause 19, wherein the set of time and/or frequency resources follows an SCI-2 of the sidelink channel.

Clause 21. The method of any of clauses 17 to 20, wherein: a plurality of sidelink search space candidates is defined for the sidelink channel, and each of the plurality of sidelink search space candidates is mapped to a Uu search space candidate for the PDCCH.

Clause 22. The method of any of clauses 17 to 21, wherein the SCI indicates whether a PSSCH of the sidelink channel includes a search space set for PDCCH repetition.

Clause 23. The method of any of clauses 17 to 22, wherein the search space information comprises: a search space candidate for the PDCCH, control resource set (CORESET) information for the PDCCH, control channel element (CCE) information for the CORESET, or any combination thereof.

Clause 24. The method of any of clauses 17 to 23, further comprising: receiving the DCI from the network entity on the PDCCH.

Clause 25. The method of clause 24, wherein a reference time for an offset (K0) between the reference time and a time at which a physical downlink shared channel (PDSCH) is scheduled by the DCI is: the later of a reception time of the DCI from the relay UE or a reception time of the DCI from the network entity, or always the reception time of the DCI from the network entity.

Clause 26. The method of any of clauses 24 to 25, wherein a reference time for an offset (K2) between the reference time and a time at which a physical uplink shared channel (PUSCH) is scheduled by the DCI is: the later of a reception time of the DCI from the relay UE or a reception time of the DCI from the network entity, or always the reception time of the DCI from the network entity.

Clause 27. The method of any of clauses 24 to 26, wherein a reference for a number of symbols (N2) is: the last symbol of the later of a search space set carrying the DCI from the relay UE or a search space set carrying the DCI from the network entity, or always the search space set carrying the DCI from the network entity.

Clause 28. The method of clause 16, further comprising: receiving the search space information from the relay UE over the sidelink channel, wherein the sidelink channel indicates the search space information based at least in part on transmission of the search space information over the sidelink channel.

Clause 29. The method of clause 28, wherein a flag in SCI on the sidelink channel indicates that the sidelink channel includes the search space information.

Clause 30. The method of clause 29, wherein the flag comprises: a bit in SCI-1 of the SCI, or a bit in SCI-2 of the SCI.

Clause 31. The method of any of clauses 28 to 30, wherein the DCI is encoded using a polar code or a low-density parity check (LDPC) code.

Clause 32. The method of any of clauses 28 to 31, wherein the search space information comprises: an indication of a slot, symbol, and application level of a search space candidate for the PDCCH, a number of CCEs and a first CCE index, control resource set (CORESET) information for the PDCCH, control channel element (CCE) information for the CORESET, or any combination thereof.

Clause 33. The method of any of clauses 28 to 32, further comprising: receiving the DCI from the network entity on the PDCCH.

Clause 34. The method of clause 33, wherein: a reference time for an offset (K0) between the reference time and a time at which a physical downlink shared channel (PDSCH) is scheduled by the DCI is a reception time of the DCI from the network entity, a reference time for an offset (K2) between the reference time and a time at which a physical uplink shared channel (PUSCH) is scheduled by the DCI is the reception time of the DCI from the network entity, a reference for a number of symbols (N2) is the last symbol of a search space set carrying the DCI from the network entity, and the sidelink channel further indicates a slot containing a search space candidate for the DCI.

Clause 35. The method of any of clauses 33 to 34, wherein: a reference time for an offset (K0) between the reference time and a time at which a physical downlink shared channel (PDSCH) is scheduled by the DCI is a reception time of the DCI from the relay UE, a reference time for an offset (K2) between the reference time and a time at which a physical uplink shared channel (PUSCH) is scheduled by the DCI is the reception time of the DCI from the relay UE, and a reference for a number of symbols (N2) is the last symbol of a search space set carrying the DCI from the relay UE.

Clause 36. The method of any of clauses 16 to 35, further comprising: determining a physical uplink control channel (PUCCH) resource indicator (PRI) from the search space information, wherein the search space information comprises a number of CCEs and a first CCE index.

Clause 37. The method of any of clauses 16 to 36, further comprising: receiving a PRI from the relay UE on the sidelink channel.

Clause 38. The method of any of clauses 16 to 37, further comprising: receiving the DCI from the network entity on the PDCCH; determining a time duration during which a quasi-colocation (QCL) relation is valid based on the last symbol of the later of the DCI from the relay UE or the DCI from the network entity, or the last symbol of the DCI from the network entity; and communicating with the network entity during the time duration based on the QCL relation.

Clause 39. The method of any of clauses 16 to 38, wherein a PDSCH scheduled by the DCI does not start before the later of a first symbol of a search space for the DCI and an SCI-1 of the sidelink channel.

Clause 40. The method of any of clauses 16 to 39, wherein the sidelink channel comprises a physical sidelink shared channel (PSSCH).

Clause 41. A method of wireless communication performed by a network entity, comprising: transmitting, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and communicating with the target UE using the resource allocation granted by the DCI for the physical downlink channel, the physical uplink channel, or both between the target UE and the network entity based on the DCI and the search space information.

Clause 42. The method of clause 41, wherein the search space information comprises: a search space candidate for the PDCCH, control resource set (CORESET) information for the PDCCH, control channel element (CCE) information for the CORESET, or any combination thereof.

Clause 43. The method of any of clauses 41 to 42, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 44. The method of any of clauses 41 to 43, wherein the DCI for the relay UE is transmitted via a PDCCH between the relay UE and the network entity, medium access control control element (MAC-CE) signaling, or radio resource control (RRC) signaling.

Clause 45. The method of any of clauses 41 to 44, further comprising: transmitting, to the target UE on the PDCCH, the DCI for the communication session between the network entity and the target UE.

Clause 46. A relay user equipment (UE), comprising: a memory; at least one transceiver; and at least one processor communicatively coupled to the memory and the at least one transceiver, the at least one processor configured to: receive, via the at least one transceiver, from a network entity, downlink control information (DCI) for a communication session between the network entity and a target UE; and transmit, via the at least one transceiver, the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

Clause 47. The relay UE of clause 46, wherein the sidelink channel indicates the search space information based at least in part on a position of sidelink control information (SCI) on the sidelink channel.

Clause 48. The relay UE of clause 47, wherein: the SCI comprises an SCI-1, and a position of the SCI-1 on a subchannel of the sidelink channel indicates a PDCCH monitoring occasion.

Clause 49. The relay UE of any of clauses 47 to 48, wherein a set of time and/or frequency resources is defined on a physical sidelink shared channel (PSSCH) of the sidelink channel for PDCCH repetition.

Clause 50. The relay UE of clause 49, wherein the set of time and/or frequency resources follows an SCI-2 of the sidelink channel.

Clause 51. The relay UE of any of clauses 47 to 50, wherein: a plurality of sidelink search space candidates is defined for the sidelink channel, and each of the plurality of sidelink search space candidates is mapped to a Uu search space candidate for the PDCCH.

Clause 52. The relay UE of any of clauses 47 to 51, wherein the SCI indicates whether a PSSCH of the sidelink channel includes a search space set for PDCCH repetition.

Clause 53. The relay UE of any of clauses 47 to 52, wherein the search space information comprises: a search space candidate for the PDCCH, control resource set (CORESET) information for the PDCCH, control channel element (CCE) information for the CORESET, or any combination thereof.

Clause 54. The relay UE of clause 46, wherein the at least one processor is further configured to: transmit, via the at least one transceiver, the search space information to the target UE over the sidelink channel, wherein the sidelink channel indicates the search space information based at least in part on transmission of the search space information over the sidelink channel.

Clause 55. The relay UE of clause 54, wherein a flag in SCI on the sidelink channel indicates that the sidelink channel includes the search space information.

Clause 56. The relay UE of clause 55, wherein the flag comprises: a bit in SCI-1 of the SCI, or a bit in SCI-2 of the SCI.

Clause 57. The relay UE of any of clauses 54 to 56, wherein the DCI is encoded using a polar code or a low-density parity check (LDPC) code.

Clause 58. The relay UE of any of clauses 54 to 57, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 59. The relay UE of any of clauses 46 to 58, wherein the DCI for the target UE is received via a PDCCH between the relay UE and the network entity, medium access control control element (MAC-CE) signaling, or radio resource control (RRC) signaling.

Clause 60. The relay UE of any of clauses 46 to 59, wherein the sidelink channel comprises a physical sidelink shared channel (PSSCH).

Clause 61. A target user equipment (UE), comprising: a memory; at least one transceiver; and at least one processor communicatively coupled to the memory and the at least one transceiver, the at least one processor configured to: receive, via the at least one transceiver, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and communicate, via the at least one transceiver, with the network entity using a resource allocation granted by the DCI for a physical downlink channel, a physical uplink channel, or both between the target UE and the network entity based on the DCI and the search space information.

Clause 62. The target UE of clause 61, wherein the sidelink channel indicates the search space information based at least in part on a position of sidelink control information (SCI) on the sidelink channel.

Clause 63. The target UE of clause 62, wherein: the SCI comprises an SCI-1, and a position of the SCI-1 on a subchannel of the sidelink channel indicates a PDCCH monitoring occasion.

Clause 64. The target UE of any of clauses 62 to 63, wherein a set of time and/or frequency resources is defined on a physical sidelink shared channel (PSSCH) of the sidelink channel for PDCCH repetition.

Clause 65. The target UE of clause 64, wherein the set of time and/or frequency resources follows an SCI-2 of the sidelink channel.

Clause 66. The target UE of any of clauses 62 to 65, wherein: a plurality of sidelink search space candidates is defined for the sidelink channel, and each of the plurality of sidelink search space candidates is mapped to a Uu search space candidate for the PDCCH.

Clause 67. The target UE of any of clauses 62 to 66, wherein the SCI indicates whether a PSSCH of the sidelink channel includes a search space set for PDCCH repetition.

Clause 68. The target UE of any of clauses 62 to 67, wherein the search space information comprises: a search space candidate for the PDCCH, control resource set (CORESET) information for the PDCCH, control channel element (CCE) information for the CORESET, or any combination thereof.

Clause 69. The target UE of any of clauses 62 to 68, wherein the at least one processor is further configured to: receive, via the at least one transceiver, the DCI from the network entity on the PDCCH.

Clause 70. The target UE of clause 69, wherein a reference time for an offset (K0) between the reference time and a time at which a physical downlink shared channel (PDSCH) is scheduled by the DCI is: the later of a reception time of the DCI from the relay UE or a reception time of the DCI from the network entity, or always the reception time of the DCI from the network entity.

Clause 71. The target UE of any of clauses 69 to 70, wherein a reference time for an offset (K2) between the reference time and a time at which a physical uplink shared channel (PUSCH) is scheduled by the DCI is: the later of a reception time of the DCI from the relay UE or a reception time of the DCI from the network entity, or always the reception time of the DCI from the network entity.

Clause 72. The target UE of any of clauses 69 to 71, wherein a reference for a number of symbols (N2) is: the last symbol of the later of a search space set carrying the DCI from the relay UE or a search space set carrying the DCI from the network entity, or always the search space set carrying the DCI from the network entity.

Clause 73. The target UE of clause 61, wherein the at least one processor is further configured to: receive, via the at least one transceiver, the search space information from the relay UE over the sidelink channel, wherein the sidelink channel indicates the search space information based at least in part on transmission of the search space information over the sidelink channel.

Clause 74. The target UE of clause 73, wherein a flag in SCI on the sidelink channel indicates that the sidelink channel includes the search space information.

Clause 75. The target UE of clause 74, wherein the flag comprises: a bit in SCI-1 of the SCI, or a bit in SCI-2 of the SCI.

Clause 76. The target UE of any of clauses 73 to 75, wherein the DCI is encoded using a polar code or a low-density parity check (LDPC) code.

Clause 77. The target UE of any of clauses 73 to 76, wherein the search space information comprises: an indication of a slot, symbol, and application level of a search space candidate for the PDCCH, a number of CCEs and a first CCE index, control resource set (CORESET) information for the PDCCH, control channel element (CCE) information for the CORESET, or any combination thereof.

Clause 78. The target UE of any of clauses 73 to 77, wherein the at least one processor is further configured to: receive, via the at least one transceiver, the DCI from the network entity on the PDCCH.

Clause 79. The target UE of clause 78, wherein: a reference time for an offset (K0) between the reference time and a time at which a physical downlink shared channel (PDSCH) is scheduled by the DCI is a reception time of the DCI from the network entity, a reference time for an offset (K2) between the reference time and a time at which a physical uplink shared channel (PUSCH) is scheduled by the DCI is the reception time of the DCI from the network entity, a reference for a number of symbols (N2) is the last symbol of a search space set carrying the DCI from the network entity, and the sidelink channel further indicates a slot containing a search space candidate for the DCI.

Clause 80. The target UE of any of clauses 78 to 79, wherein: a reference time for an offset (K0) between the reference time and a time at which a physical downlink shared channel (PDSCH) is scheduled by the DCI is a reception time of the DCI from the relay UE, a reference time for an offset (K2) between the reference time and a time at which a physical uplink shared channel (PUSCH) is scheduled by the DCI is the reception time of the DCI from the relay UE, and a reference for a number of symbols (N2) is the last symbol of a search space set carrying the DCI from the relay UE.

Clause 81. The target UE of any of clauses 61 to 80, wherein the at least one processor is further configured to: determine a physical uplink control channel (PUCCH) resource indicator (PRI) from the search space information, wherein the search space information comprises a number of CCEs and a first CCE index.

Clause 82. The target UE of any of clauses 61 to 81, wherein the at least one processor is further configured to: receive, via the at least one transceiver, a PRI from the relay UE on the sidelink channel.

Clause 83. The target UE of any of clauses 61 to 82, wherein the at least one processor is further configured to: receive, via the at least one transceiver, the DCI from the network entity on the PDCCH; determine a time duration during which a quasi-colocation (QCL) relation is valid based on the last symbol of the later of the DCI from the relay UE or the DCI from the network entity, or the last symbol of the DCI from the network entity; and communicate, via the at least one transceiver, with the network entity during the time duration based on the QCL relation.

Clause 84. The target UE of any of clauses 61 to 83, wherein a PDSCH scheduled by the DCI does not start before the later of a first symbol of a search space for the DCI and an SCI-1 of the sidelink channel.

Clause 85. The target UE of any of clauses 61 to 84, wherein the sidelink channel comprises a physical sidelink shared channel (PSSCH).

Clause 86. A network entity, comprising: a memory; at least one transceiver; and at least one processor communicatively coupled to the memory and the at least one transceiver, the at least one processor configured to: transmit, via the at least one transceiver, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and communicate, via the at least one transceiver, with the target UE using the resource allocation granted by the DCI for the physical downlink channel, the physical uplink channel, or both between the target UE and the network entity based on the DCI and the search space information.

Clause 87. The network entity of clause 86, wherein the search space information comprises: a search space candidate for the PDCCH, control resource set (CORESET) information for the PDCCH, control channel element (CCE) information for the CORESET, or any combination thereof.

Clause 88. The network entity of any of clauses 86 to 87, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 89. The network entity of any of clauses 86 to 88, wherein the DCI for the relay UE is transmitted via a PDCCH between the relay UE and the network entity, medium access control control element (MAC-CE) signaling, or radio resource control (RRC) signaling.

Clause 90. The network entity of any of clauses 86 to 89, wherein the at least one processor is further configured to: transmit, via the at least one transceiver, to the target UE on the PDCCH, the DCI for the communication session between the network entity and the target UE.

Clause 91. A relay user equipment (UE), comprising: means for receiving, from a network entity, downlink control information (DCI) for a communication session between the network entity and a target UE; and means for transmitting the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

Clause 92. The relay UE of clause 91, wherein the sidelink channel indicates the search space information based at least in part on a position of sidelink control information (SCI) on the sidelink channel.

Clause 93. The relay UE of clause 92, wherein: the SCI comprises an SCI-1, and a position of the SCI-1 on a subchannel of the sidelink channel indicates a PDCCH monitoring occasion.

Clause 94. The relay UE of any of clauses 92 to 93, wherein a set of time and/or frequency resources is defined on a physical sidelink shared channel (PSSCH) of the sidelink channel for PDCCH repetition.

Clause 95. The relay UE of clause 94, wherein the set of time and/or frequency resources follows an SCI-2 of the sidelink channel.

Clause 96. The relay UE of any of clauses 92 to 95, wherein: a plurality of sidelink search space candidates is defined for the sidelink channel, and each of the plurality of sidelink search space candidates is mapped to a Uu search space candidate for the PDCCH.

Clause 97. The relay UE of any of clauses 92 to 96, wherein the SCI indicates whether a PSSCH of the sidelink channel includes a search space set for PDCCH repetition.

Clause 98. The relay UE of any of clauses 92 to 97, wherein the search space information comprises: a search space candidate for the PDCCH, control resource set (CORESET) information for the PDCCH, control channel element (CCE) information for the CORESET, or any combination thereof.

Clause 99. The relay UE of clause 91, further comprising: means for transmitting the search space information to the target UE over the sidelink channel, wherein the sidelink channel indicates the search space information based at least in part on transmission of the search space information over the sidelink channel.

Clause 100. The relay UE of clause 99, wherein a flag in SCI on the sidelink channel indicates that the sidelink channel includes the search space information.

Clause 101. The relay UE of clause 100, wherein the flag comprises: a bit in SCI-1 of the SCI, or a bit in SCI-2 of the SCI.

Clause 102. The relay UE of any of clauses 99 to 101, wherein the DCI is encoded using a polar code or a low-density parity check (LDPC) code.

Clause 103. The relay UE of any of clauses 99 to 102, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 104. The relay UE of any of clauses 91 to 103, wherein the DCI for the target UE is received via a PDCCH between the relay UE and the network entity, medium access control control element (MAC-CE) signaling, or radio resource control (RRC) signaling.

Clause 105. The relay UE of any of clauses 91 to 104, wherein the sidelink channel comprises a physical sidelink shared channel (PSSCH).

Clause 106. A target user equipment (UE), comprising: means for receiving, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and means for communicating with the network entity using a resource allocation granted by the DCI for a physical downlink channel, a physical uplink channel, or both between the target UE and the network entity based on the DCI and the search space information.

Clause 107. The target UE of clause 106, wherein the sidelink channel indicates the search space information based at least in part on a position of sidelink control information (SCI) on the sidelink channel.

Clause 108. The target UE of clause 107, wherein: the SCI comprises an SCI-1, and a position of the SCI-1 on a subchannel of the sidelink channel indicates a PDCCH monitoring occasion.

Clause 109. The target UE of any of clauses 107 to 108, wherein a set of time and/or frequency resources is defined on a physical sidelink shared channel (PSSCH) of the sidelink channel for PDCCH repetition.

Clause 110. The target UE of clause 109, wherein the set of time and/or frequency resources follows an SCI-2 of the sidelink channel.

Clause 111. The target UE of any of clauses 107 to 110, wherein: a plurality of sidelink search space candidates is defined for the sidelink channel, and each of the plurality of sidelink search space candidates is mapped to a Uu search space candidate for the PDCCH.

Clause 112. The target UE of any of clauses 107 to 111, wherein the SCI indicates whether a PSSCH of the sidelink channel includes a search space set for PDCCH repetition.

Clause 113. The target UE of any of clauses 107 to 112, wherein the search space information comprises: a search space candidate for the PDCCH, control resource set (CORESET) information for the PDCCH, control channel element (CCE) information for the CORESET, or any combination thereof.

Clause 114. The target UE of any of clauses 107 to 113, further comprising: means for receiving the DCI from the network entity on the PDCCH.

Clause 115. The target UE of clause 114, wherein a reference time for an offset (K0) between the reference time and a time at which a physical downlink shared channel (PDSCH) is scheduled by the DCI is: the later of a reception time of the DCI from the relay UE or a reception time of the DCI from the network entity, or always the reception time of the DCI from the network entity.

Clause 116. The target UE of any of clauses 114 to 115, wherein a reference time for an offset (K2) between the reference time and a time at which a physical uplink shared channel (PUSCH) is scheduled by the DCI is: the later of a reception time of the DCI from the relay UE or a reception time of the DCI from the network entity, or always the reception time of the DCI from the network entity.

Clause 117. The target UE of any of clauses 114 to 116, wherein a reference for a number of symbols (N2) is: the last symbol of the later of a search space set carrying the DCI from the relay UE or a search space set carrying the DCI from the network entity, or always the search space set carrying the DCI from the network entity.

Clause 118. The target UE of clause 106, further comprising: means for receiving the search space information from the relay UE over the sidelink channel, wherein the sidelink channel indicates the search space information based at least in part on transmission of the search space information over the sidelink channel.

Clause 119. The target UE of clause 118, wherein a flag in SCI on the sidelink channel indicates that the sidelink channel includes the search space information.

Clause 120. The target UE of clause 119, wherein the flag comprises: a bit in SCI-1 of the SCI, or a bit in SCI-2 of the SCI.

Clause 121. The target UE of any of clauses 118 to 120, wherein the DCI is encoded using a polar code or a low-density parity check (LDPC) code.

Clause 122. The target UE of any of clauses 118 to 121, wherein the search space information comprises: an indication of a slot, symbol, and application level of a search space candidate for the PDCCH, a number of CCEs and a first CCE index, control resource set (CORESET) information for the PDCCH, control channel element (CCE) information for the CORESET, or any combination thereof.

Clause 123. The target UE of any of clauses 118 to 122, further comprising: means for receiving the DCI from the network entity on the PDCCH.

Clause 124. The target UE of clause 123, wherein: a reference time for an offset (K0) between the reference time and a time at which a physical downlink shared channel (PDSCH) is scheduled by the DCI is a reception time of the DCI from the network entity, a reference time for an offset (K2) between the reference time and a time at which a physical uplink shared channel (PUSCH) is scheduled by the DCI is the reception time of the DCI from the network entity, a reference for a number of symbols (N2) is the last symbol of a search space set carrying the DCI from the network entity, and the sidelink channel further indicates a slot containing a search space candidate for the DCI.

Clause 125. The target UE of any of clauses 123 to 124, wherein: a reference time for an offset (K0) between the reference time and a time at which a physical downlink shared channel (PDSCH) is scheduled by the DCI is a reception time of the DCI from the relay UE, a reference time for an offset (K2) between the reference time and a time at which a physical uplink shared channel (PUSCH) is scheduled by the DCI is the reception time of the DCI from the relay UE, and a reference for a number of symbols (N2) is the last symbol of a search space set carrying the DCI from the relay UE.

Clause 126. The target UE of any of clauses 106 to 125, further comprising: means for determining a physical uplink control channel (PUCCH) resource indicator (PRI) from the search space information, wherein the search space information comprises a number of CCEs and a first CCE index.

Clause 127. The target UE of any of clauses 106 to 126, further comprising: means for receiving a PRI from the relay UE on the sidelink channel.

Clause 128. The target UE of any of clauses 106 to 127, further comprising: means for receiving the DCI from the network entity on the PDCCH; means for determining a time duration during which a quasi-colocation (QCL) relation is valid based on the last symbol of the later of the DCI from the relay UE or the DCI from the network entity, or the last symbol of the DCI from the network entity; and means for communicating with the network entity during the time duration based on the QCL relation.

Clause 129. The target UE of any of clauses 106 to 128, wherein a PDSCH scheduled by the DCI does not start before the later of a first symbol of a search space for the DCI and an SCI-1 of the sidelink channel.

Clause 130. The target UE of any of clauses 106 to 129, wherein the sidelink channel comprises a physical sidelink shared channel (PSSCH).

Clause 131. A network entity, comprising: means for transmitting, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and means for communicating with the target UE using the resource allocation granted by the DCI for the physical downlink channel, the physical uplink channel, or both between the target UE and the network entity based on the DCI and the search space information.

Clause 132. The network entity of clause 131, wherein the search space information comprises: a search space candidate for the PDCCH, control resource set (CORESET) information for the PDCCH, control channel element (CCE) information for the CORESET, or any combination thereof.

Clause 133. The network entity of any of clauses 131 to 132, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 134. The network entity of any of clauses 131 to 133, wherein the DCI for the relay UE is transmitted via a PDCCH between the relay UE and the network entity, medium access control control element (MAC-CE) signaling, or radio resource control (RRC) signaling.

Clause 135. The network entity of any of clauses 131 to 134, further comprising: means for transmitting, to the target UE on the PDCCH, the DCI for the communication session between the network entity and the target UE.

Clause 136. A non-transitory computer-readable medium storing computer-executable instructions that, when executed by a relay user equipment (UE), cause the relay UE to: receive, from a network entity, downlink control information (DCI) for a communication session between the network entity and a target UE; and transmit the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

Clause 137. The non-transitory computer-readable medium of clause 136, wherein the sidelink channel indicates the search space information based at least in part on a position of sidelink control information (SCI) on the sidelink channel.

Clause 138. The non-transitory computer-readable medium of clause 137, wherein: the SCI comprises an SCI-1, and a position of the SCI-1 on a subchannel of the sidelink channel indicates a PDCCH monitoring occasion.

Clause 139. The non-transitory computer-readable medium of any of clauses 137 to 138, wherein a set of time and/or frequency resources is defined on a physical sidelink shared channel (PSSCH) of the sidelink channel for PDCCH repetition.

Clause 140. The non-transitory computer-readable medium of clause 139, wherein the set of time and/or frequency resources follows an SCI-2 of the sidelink channel.

Clause 141. The non-transitory computer-readable medium of any of clauses 137 to 140, wherein: a plurality of sidelink search space candidates is defined for the sidelink channel, and each of the plurality of sidelink search space candidates is mapped to a Uu search space candidate for the PDCCH.

Clause 142. The non-transitory computer-readable medium of any of clauses 137 to 141, wherein the SCI indicates whether a PSSCH of the sidelink channel includes a search space set for PDCCH repetition.

Clause 143. The non-transitory computer-readable medium of any of clauses 137 to 142, wherein the search space information comprises: a search space candidate for the PDCCH, control resource set (CORESET) information for the PDCCH, control channel element (CCE) information for the CORESET, or any combination thereof.

Clause 144. The non-transitory computer-readable medium of clause 136, further comprising computer-executable instructions that, when executed by the relay UE, cause the relay UE to: transmit the search space information to the target UE over the sidelink channel, wherein the sidelink channel indicates the search space information based at least in part on transmission of the search space information over the sidelink channel.

Clause 145. The non-transitory computer-readable medium of clause 144, wherein a flag in SCI on the sidelink channel indicates that the sidelink channel includes the search space information.

Clause 146. The non-transitory computer-readable medium of clause 145, wherein the flag comprises: a bit in SCI-1 of the SCI, or a bit in SCI-2 of the SCI.

Clause 147. The non-transitory computer-readable medium of any of clauses 144 to 146, wherein the DCI is encoded using a polar code or a low-density parity check (LDPC) code.

Clause 148. The non-transitory computer-readable medium of any of clauses 144 to 147, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 149. The non-transitory computer-readable medium of any of clauses 136 to 148, wherein the DCI for the target UE is received via a PDCCH between the relay UE and the network entity, medium access control control element (MAC-CE) signaling, or radio resource control (RRC) signaling.

Clause 150. The non-transitory computer-readable medium of any of clauses 136 to 149, wherein the sidelink channel comprises a physical sidelink shared channel (PSSCH).

Clause 151. A non-transitory computer-readable medium storing computer-executable instructions that, when executed by a target user equipment (UE), cause the target UE to: receive, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and communicate with the network entity using a resource allocation granted by the DCI for a physical downlink channel, a physical uplink channel, or both between the target UE and the network entity based on the DCI and the search space information.

Clause 152. The non-transitory computer-readable medium of clause 151, wherein the sidelink channel indicates the search space information based at least in part on a position of sidelink control information (SCI) on the sidelink channel.

Clause 153. The non-transitory computer-readable medium of clause 152, wherein: the SCI comprises an SCI-1, and a position of the SCI-1 on a subchannel of the sidelink channel indicates a PDCCH monitoring occasion.

Clause 154. The non-transitory computer-readable medium of any of clauses 152 to 153, wherein a set of time and/or frequency resources is defined on a physical sidelink shared channel (PSSCH) of the sidelink channel for PDCCH repetition.

Clause 155. The non-transitory computer-readable medium of clause 154, wherein the set of time and/or frequency resources follows an SCI-2 of the sidelink channel.

Clause 156. The non-transitory computer-readable medium of any of clauses 152 to 155, wherein: a plurality of sidelink search space candidates is defined for the sidelink channel, and each of the plurality of sidelink search space candidates is mapped to a Uu search space candidate for the PDCCH.

Clause 157. The non-transitory computer-readable medium of any of clauses 152 to 156, wherein the SCI indicates whether a PSSCH of the sidelink channel includes a search space set for PDCCH repetition.

Clause 158. The non-transitory computer-readable medium of any of clauses 152 to 157, wherein the search space information comprises: a search space candidate for the PDCCH, control resource set (CORESET) information for the PDCCH, control channel element (CCE) information for the CORESET, or any combination thereof.

Clause 159. The non-transitory computer-readable medium of any of clauses 152 to 158, further comprising computer-executable instructions that, when executed by the target UE, cause the target UE to: receive the DCI from the network entity on the PDCCH.

Clause 160. The non-transitory computer-readable medium of clause 159, wherein a reference time for an offset (K0) between the reference time and a time at which a physical downlink shared channel (PDSCH) is scheduled by the DCI is: the later of a reception time of the DCI from the relay UE or a reception time of the DCI from the network entity, or always the reception time of the DCI from the network entity.

Clause 161. The non-transitory computer-readable medium of any of clauses 159 to 160, wherein a reference time for an offset (K2) between the reference time and a time at which a physical uplink shared channel (PUSCH) is scheduled by the DCI is: the later of a reception time of the DCI from the relay UE or a reception time of the DCI from the network entity, or always the reception time of the DCI from the network entity.

Clause 162. The non-transitory computer-readable medium of any of clauses 159 to 161, wherein a reference for a number of symbols (N2) is: the last symbol of the later of a search space set carrying the DCI from the relay UE or a search space set carrying the DCI from the network entity, or always the search space set carrying the DCI from the network entity.

Clause 163. The non-transitory computer-readable medium of clause 151, further comprising computer-executable instructions that, when executed by the target UE, cause the target UE to: receive the search space information from the relay UE over the sidelink channel, wherein the sidelink channel indicates the search space information based at least in part on transmission of the search space information over the sidelink channel.

Clause 164. The non-transitory computer-readable medium of clause 163, wherein a flag in SCI on the sidelink channel indicates that the sidelink channel includes the search space information.

Clause 165. The non-transitory computer-readable medium of clause 164, wherein the flag comprises: a bit in SCI-1 of the SCI, or a bit in SCI-2 of the SCI.

Clause 166. The non-transitory computer-readable medium of any of clauses 163 to 165, wherein the DCI is encoded using a polar code or a low-density parity check (LDPC) code.

Clause 167. The non-transitory computer-readable medium of any of clauses 163 to 166, wherein the search space information comprises: an indication of a slot, symbol, and application level of a search space candidate for the PDCCH, a number of CCEs and a first CCE index, control resource set (CORESET) information for the PDCCH, control channel element (CCE) information for the CORESET, or any combination thereof.

Clause 168. The non-transitory computer-readable medium of any of clauses 163 to 167, further comprising computer-executable instructions that, when executed by the target UE, cause the target UE to: receive the DCI from the network entity on the PDCCH.

Clause 169. The non-transitory computer-readable medium of clause 168, wherein: a reference time for an offset (K0) between the reference time and a time at which a physical downlink shared channel (PDSCH) is scheduled by the DCI is a reception time of the DCI from the network entity, a reference time for an offset (K2) between the reference time and a time at which a physical uplink shared channel (PUSCH) is scheduled by the DCI is the reception time of the DCI from the network entity, a reference for a number of symbols (N2) is the last symbol of a search space set carrying the DCI from the network entity, and the sidelink channel further indicates a slot containing a search space candidate for the DCI.

Clause 170. The non-transitory computer-readable medium of any of clauses 168 to 169, wherein: a reference time for an offset (K0) between the reference time and a time at which a physical downlink shared channel (PDSCH) is scheduled by the DCI is a reception time of the DCI from the relay UE, a reference time for an offset (K2) between the reference time and a time at which a physical uplink shared channel (PUSCH) is scheduled by the DCI is the reception time of the DCI from the relay UE, and a reference for a number of symbols (N2) is the last symbol of a search space set carrying the DCI from the relay UE.

Clause 171. The non-transitory computer-readable medium of any of clauses 151 to 170, further comprising computer-executable instructions that, when executed by the target UE, cause the target UE to: determine a physical uplink control channel (PUCCH) resource indicator (PRI) from the search space information, wherein the search space information comprises a number of CCEs and a first CCE index.

Clause 172. The non-transitory computer-readable medium of any of clauses 151 to 171, further comprising computer-executable instructions that, when executed by the target UE, cause the target UE to: receive a PRI from the relay UE on the sidelink channel.

Clause 173. The non-transitory computer-readable medium of any of clauses 151 to 172, further comprising computer-executable instructions that, when executed by the target UE, cause the target UE to: receive the DCI from the network entity on the PDCCH;

determine a time duration during which a quasi-colocation (QCL) relation is valid based on the last symbol of the later of the DCI from the relay UE or the DCI from the network entity, or the last symbol of the DCI from the network entity; and communicate with the network entity during the time duration based on the QCL relation.

Clause 174. The non-transitory computer-readable medium of any of clauses 151 to 173, wherein a PDSCH scheduled by the DCI does not start before the later of a first symbol of a search space for the DCI and an SCI-1 of the sidelink channel.

Clause 175. The non-transitory computer-readable medium of any of clauses 151 to 174, wherein the sidelink channel comprises a physical sidelink shared channel (PSSCH).

Clause 176. A non-transitory computer-readable medium storing computer-executable instructions that, when executed by a network entity, cause the network entity to: transmit, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and communicate with the target UE using the resource allocation granted by the DCI for the physical downlink channel, the physical uplink channel, or both between the target UE and the network entity based on the DCI and the search space information.

Clause 177. The non-transitory computer-readable medium of clause 176, wherein the search space information comprises: a search space candidate for the PDCCH, control resource set (CORESET) information for the PDCCH, control channel element (CCE) information for the CORESET, or any combination thereof.

Clause 178. The non-transitory computer-readable medium of any of clauses 176 to 177, wherein the search space information comprises: an indication of a slot, symbol, and application level of a search space candidate for the PDCCH, a number of CCEs and a first CCE control resource set (CORESET) information for the PDCCH, control channel element (CCE) information for the CORESET, or any combination thereof.

Clause 179. The non-transitory computer-readable medium of any of clauses 176 to 178, wherein the DCI for the relay UE is transmitted via a PDCCH between the relay UE and the network entity, medium access control control element (MAC-CE) signaling, or radio resource control (RRC) signaling.

Clause 180. The non-transitory computer-readable medium of any of clauses 176 to 179, further comprising computer-executable instructions that, when executed by the network entity, cause the network entity to: transmit, to the target UE on the PDCCH, the DCI for the communication session between the network entity and the target UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A relay user equipment (UE), comprising:
at least one memory;
at least one transceiver; and
at least one processor communicatively coupled to the at least one memory and the at least one transceiver, the at least one processor configured to:

receive, via the at least one transceiver, from a network entity, downlink control information (DCI) for a communication session between the network entity and a target UE; and transmit, via the at least one transceiver, the DCI to the target UE over a sidelink channel between the relay UE and the target UE, wherein the sidelink channel indicates search space information for a physical downlink control channel (PDCCH) between the target UE and the network entity carrying the DCI, and wherein the search space information is associated with a resource allocation granted by the DCI for a physical downlink channel, a physical uplink channel, or both between the target UE and the network entity.

2. The relay UE of claim 1, wherein the sidelink channel indicates the search space information based at least in part on a position of sidelink control information (SCI) on the sidelink channel.

3. The relay UE of claim 2, wherein:
the SCI comprises an SCI-1, and
a position of the SCI-1 on a subchannel of the sidelink channel indicates a PDCCH monitoring occasion.

4. The relay UE of claim 2, wherein a set of time and/or frequency resources is defined on a physical sidelink shared channel (PSSCH) of the sidelink channel for PDCCH repetition.

5. The relay UE of claim 4, wherein the set of time and/or frequency resources follows an SCI-2 of the sidelink channel.

6. The relay UE of claim 2, wherein:
a plurality of sidelink search space candidates is defined for the sidelink channel, and
each of the plurality of sidelink search space candidates is mapped to a Uu search space candidate for the PDCCH.

7. The relay UE of claim 2, wherein the SCI indicates whether a PSSCH of the sidelink channel includes a search space set for PDCCH repetition.

8. The relay UE of claim 2, wherein the search space information comprises:
a search space candidate for the PDCCH,
control resource set (CORESET) information for the PDCCH,
control channel element (CCE) information for the CORESET, or
any combination thereof.

9. The relay UE of claim 1, wherein the at least one processor is further configured to:
transmit, via the at least one transceiver, the search space information to the target UE over the sidelink channel, wherein the sidelink channel indicates the search space information based at least in part on transmission of the search space information over the sidelink channel.

10. The relay UE of claim 9, wherein:
a flag in SCI on the sidelink channel indicates that the sidelink channel includes the search space information, and
the flag comprises:
a bit in SCI-1 of the SCI, or
a bit in SCI-2 of the SCI.

11. The relay UE of claim 9, wherein the search space information comprises:
an indication of a slot, symbol, and application level of a search space candidate for the PDCCH,
a number of CCEs and a first CCE
control resource set (CORESET) information for the PDCCH,
control channel element (CCE) information for the CORESET, or
any combination thereof.

12. The relay UE of claim 1, wherein the DCI for the target UE is received via a PDCCH between the relay UE and the network entity, medium access control control element (MAC-CE) signaling, or radio resource control (RRC) signaling.

13. A target user equipment (UE), comprising:
at least one memory;
at least one transceiver; and
at least one processor communicatively coupled to the at least one memory and the at least one transceiver, the at least one processor configured to:
receive, via the at least one transceiver, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and
communicate, via the at least one transceiver, with the network entity using a resource allocation granted by the DCI for a physical downlink channel, a physical uplink channel, or both between the target UE and the network entity based on the DCI and the search space information.

14. The target UE of claim 13, wherein the sidelink channel indicates the search space information based at least in part on a position of sidelink control information (SCI) on the sidelink channel.

15. The target UE of claim 14, wherein:
the SCI comprises an SCI-1, and
a position of the SCI-1 on a subchannel of the sidelink channel indicates a PDCCH monitoring occasion.

16. The target UE of claim 14, wherein a set of time and/or frequency resources is defined on a physical sidelink shared channel (PSSCH) of the sidelink channel for PDCCH repetition.

17. The target UE of claim 16, wherein the set of time and/or frequency resources follows an SCI-2 of the sidelink channel.

18. The target UE of claim 14, wherein:
a plurality of sidelink search space candidates is defined for the sidelink channel, and
each of the plurality of sidelink search space candidates is mapped to a Uu search space candidate for the PDCCH.

19. The target UE of claim 14, wherein the SCI indicates whether a PSSCH of the sidelink channel includes a search space set for PDCCH repetition.

20. The target UE of claim 14, wherein the search space information comprises:
a search space candidate for the PDCCH,
control resource set (CORESET) information for the PDCCH,
control channel element (CCE) information for the CORESET, or
any combination thereof.

21. The target UE of claim 13, wherein the at least one processor is further configured to:
receive, via the at least one transceiver, the search space information from the relay UE over the sidelink channel, wherein the sidelink channel indicates the search space information based at least in part on transmission of the search space information over the sidelink channel.

22. The target UE of claim 21, wherein:
a flag in SCI on the sidelink channel indicates that the sidelink channel includes the search space information, and
the flag comprises:
a bit in SCI-1 of the SCI, or
a bit in SCI-2 of the SCI.

23. The target UE of claim 21, wherein the search space information comprises:
an indication of a slot, symbol, and application level of a search space candidate for the PDCCH,
a number of CCEs and a first CCE index,
control resource set (CORESET) information for the PDCCH,
control channel element (CCE) information for the CORESET, or
any combination thereof.

24. The target UE of claim 13, wherein the at least one processor is further configured to:
receive, via the at least one transceiver, the DCI from the network entity on the PDCCH;
determine a time duration during which a quasi-colocation (QCL) relation is valid based on the last symbol of the later of the DCI from the relay UE or the DCI from the network entity, or the last symbol of the DCI from the network entity; and
communicate, via the at least one transceiver, with the network entity during the time duration based on the QCL relation.

25. The target UE of claim 13, wherein a PDSCH scheduled by the DCI does not start before the later of a first symbol of a search space for the DCI and an SCI-1 of the sidelink channel.

26. A network entity, comprising:
at least one memory;
at least one transceiver; and
at least one processor communicatively coupled to the at least one memory and the at least one transceiver, the at least one processor configured to:
transmit, via the at least one transceiver, to a relay user equipment (UE), downlink control information (DCI) for a communication session between the network entity and a target UE and search space information for a physical downlink control channel (PDCCH) between the target UE and the network entity, the search space information associated with a resource allocation granted by the DCI for a physical downlink channel, a physical uplink channel, or both between the target UE and the network entity; and
communicate, via the at least one transceiver, with the target UE using the resource allocation granted by the DCI for the physical downlink channel, the physical uplink channel, or both between the target UE and the network entity based on the DCI and the search space information.

27. The network entity of claim 26, wherein the search space information comprises:
a search space candidate for the PDCCH,
control resource set (CORESET) information for the PDCCH,
control channel element (CCE) information for the CORESET, or
any combination thereof.

28. The network entity of claim 26, wherein the search space information comprises:
an indication of a slot, symbol, and application level of a search space candidate for the PDCCH,
a number of CCEs and a first CCE
control resource set (CORESET) information for the PDCCH,
control channel element (CCE) information for the CORESET, or
any combination thereof.

29. The network entity of claim 26, wherein the DCI for the relay UE is transmitted via a PDCCH between the relay UE and the network entity, medium access control control element (MAC-CE) signaling, or radio resource control (RRC) signaling.

30. A method of wireless communication performed by a target user equipment (UE), comprising:
receiving, from a relay UE over a sidelink channel between the target UE and the relay UE, downlink control information (DCI) for a communication session between the target UE and a network entity, wherein the sidelink channel indicates search space information for a physical downlink control channel (PDCCH) between the target UE and the network entity carrying the DCI; and
communicating with the network entity using a resource allocation granted by the DCI for a physical downlink channel, a physical uplink channel, or both between the target UE and the network entity based on the DCI and the search space information.

* * * * *